US012725030B2

(12) United States Patent
Kurasawa et al.

(10) Patent No.: US 12,725,030 B2
(45) Date of Patent: Sep. 1, 2026

(54) METHOD, APPARATUS, AND NON-TEMPORARY COMPUTER-READABLE MEDIUM THAT USES A VECTOR NEURAL NETWORK

(71) Applicant: SEIKO EPSON CORPORATION, Tokyo (JP)

(72) Inventors: Hikaru Kurasawa, Shiojiri (JP); Kana Kanazawa, Shiojiri (JP); Ryoki Watanabe, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 1284 days.

(21) Appl. No.: 17/333,271

(22) Filed: May 28, 2021

(65) Prior Publication Data

US 2021/0374535 A1 Dec. 2, 2021

(30) Foreign Application Priority Data

May 29, 2020 (JP) ................................ 2020-094200
May 29, 2020 (JP) ................................ 2020-094205

(51) Int. Cl.

| | |
|---|---|
| ***G06N 3/08*** | (2023.01) |
| ***G06F 18/2132*** | (2023.01) |
| ***G06F 18/214*** | (2023.01) |
| ***G06F 18/22*** | (2023.01) |
| ***G06N 3/045*** | (2023.01) |
| ***G06N 3/048*** | (2023.01) |

(52) U.S. Cl.

CPC ........... *G06N 3/08* (2013.01); *G06F 18/2132* (2023.01); *G06F 18/214* (2023.01); *G06F 18/22* (2023.01); *G06N 3/045* (2023.01); *G06N 3/048* (2023.01)

(58) Field of Classification Search

None

See application file for complete search history.

(56) References Cited

U.S. PATENT DOCUMENTS 5,210,798 A 5/1993 Ekchian et al.
2020/0285934 A1* 9/2020 Hinton .................... G06N 3/04

FOREIGN PATENT DOCUMENTS

CN 109446985 A 3/2019
WO 2019/083553 A1 5/2019

OTHER PUBLICATIONS

Hinton, Geoffrey et al.;"Matrix Capsules with EM Routing"; Published as a conference paper at ICLR 2018; pp. 1-15.

(Continued)

*Primary Examiner* — Daniel T Pellett
(74) *Attorney, Agent, or Firm* — Oliff PLC

(57) ABSTRACT

A method of causing one or more processors to execute: performing learning of a model that is an algorithm of a vector neural network type to reproduce correspondence between a plurality of first data elements included in a first data set and a pre-label corresponding to each of the plurality of first data elements, in which the model has one or more neuron layers, each of the one or more neuron layers has one or more neuron groups, each of the one or more neuron groups has one or more neurons, and each of the one or more neurons outputs first intermediate data based on at least one of a first vector and a first activation; and inputting the first data set into the learned model and acquiring the first intermediate data output by the one or more neurons by being associated with the neuron.

20 Claims, 12 Drawing Sheets

(56) References Cited

OTHER PUBLICATIONS

Sabour, Sara et al.;"Dynamic Routing Between Capsules"; 31st Conference on Neural Information Processing Systems; (NIPS 2017); pp. 1-11.

* cited by examiner

Figure 1:
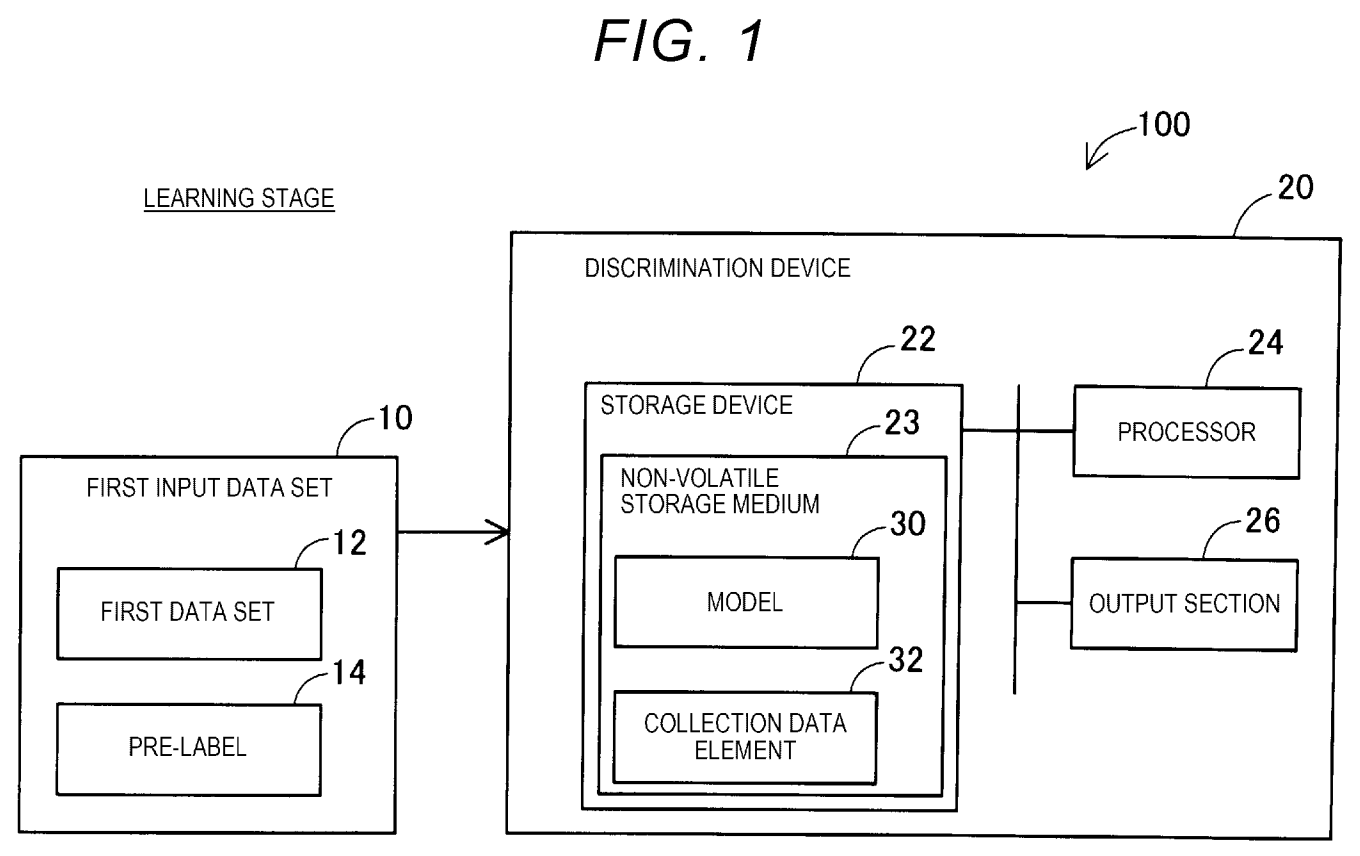

LEARNING STAGE

10 FIRST INPUT DATA SET

12 FIRST DATA SET

14 PRE-LABEL

20 DISCRIMINATION DEVICE

22 STORAGE DEVICE

23 NON-VOLATILE STORAGE MEDIUM

30 MODEL

32 COLLECTION DATA ELEMENT

24 PROCESSOR

26 OUTPUT SECTION

39 kernel:32

VN:16

VN:12

VN:6

VN:2 ks 5×5
stride 2 ks 1×1
stride 1 ks 3×3
stride 1 ks 7×7
stride 2 ks 3×3
stride 1

Figure 7:
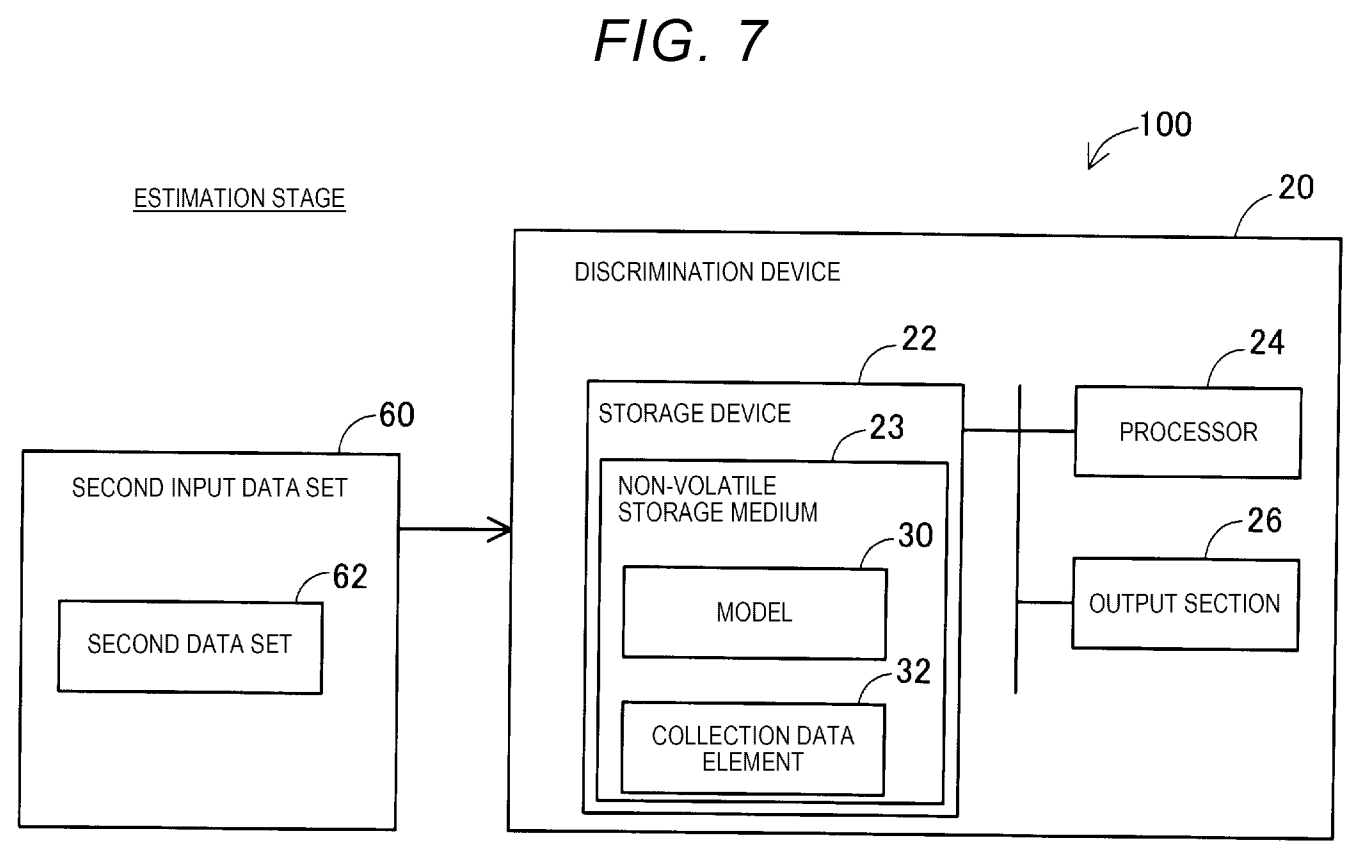

ESTIMATION STAGE

60
SECOND INPUT DATA SET
62
SECOND DATA SET

20
DISCRIMINATION DEVICE
22
STORAGE DEVICE
23
NON-VOLATILE
STORAGE MEDIUM
30
MODEL
32
COLLECTION DATA
ELEMENT
24
PROCESSOR
26
OUTPUT SECTION

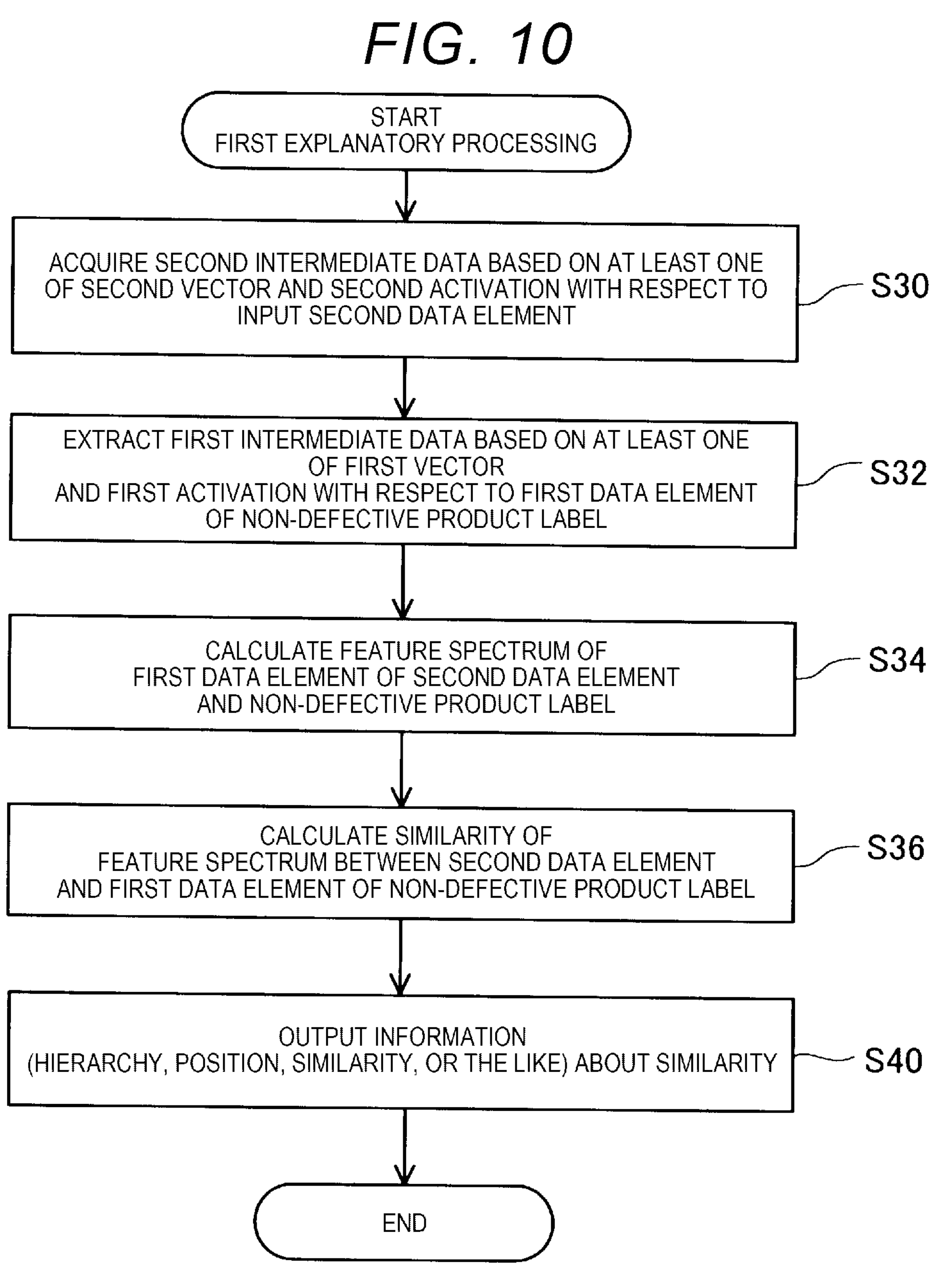
FIG. 10
START
FIRST EXPLANATORY PROCESSING
ACQUIRE SECOND INTERMEDIATE DATA BASED ON AT LEAST ONE OF SECOND VECTOR AND SECOND ACTIVATION WITH RESPECT TO INPUT SECOND DATA ELEMENT
S30
EXTRACT FIRST INTERMEDIATE DATA BASED ON AT LEAST ONE OF FIRST VECTOR AND FIRST ACTIVATION WITH RESPECT TO FIRST DATA ELEMENT OF NON-DEFECTIVE PRODUCT LABEL
S32
CALCULATE FEATURE SPECTRUM OF FIRST DATA ELEMENT OF SECOND DATA ELEMENT AND NON-DEFECTIVE PRODUCT LABEL
S34
CALCULATE SIMILARITY OF FEATURE SPECTRUM BETWEEN SECOND DATA ELEMENT AND FIRST DATA ELEMENT OF NON-DEFECTIVE PRODUCT LABEL
S36
OUTPUT INFORMATION (HIERARCHY, POSITION, SIMILARITY, OR THE LIKE) ABOUT SIMILARITY
S40
END 37
Rx
Sp
0
1
2
3
4
5
6
7
8
9
10
11
a
0

FIG. 12

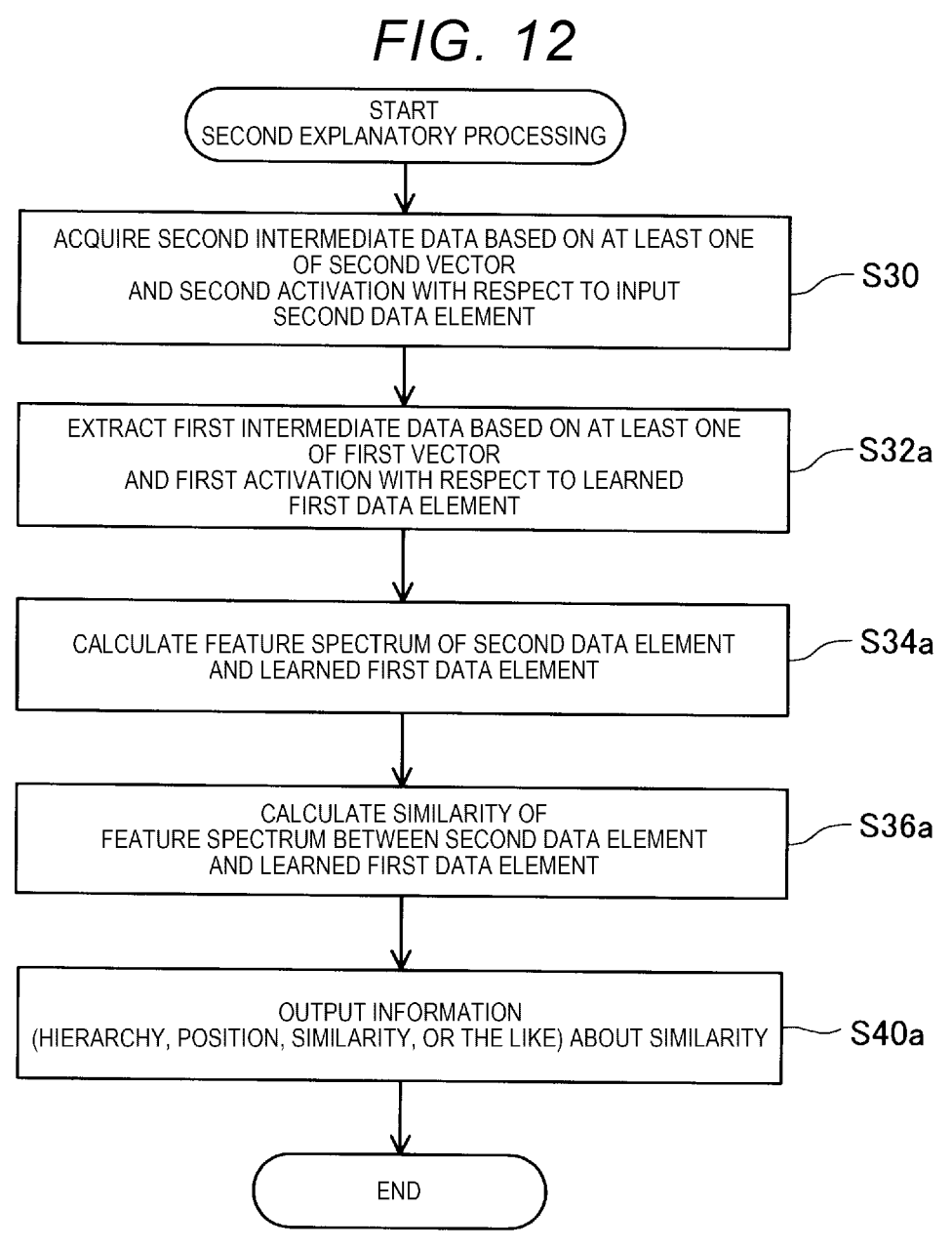

START
SECOND EXPLANATORY PROCESSING

ACQUIRE SECOND INTERMEDIATE DATA BASED ON AT LEAST ONE OF SECOND VECTOR AND SECOND ACTIVATION WITH RESPECT TO INPUT SECOND DATA ELEMENT — S30

EXTRACT FIRST INTERMEDIATE DATA BASED ON AT LEAST ONE OF FIRST VECTOR AND FIRST ACTIVATION WITH RESPECT TO LEARNED FIRST DATA ELEMENT — S32a

CALCULATE FEATURE SPECTRUM OF SECOND DATA ELEMENT AND LEARNED FIRST DATA ELEMENT — S34a

CALCULATE SIMILARITY OF FEATURE SPECTRUM BETWEEN SECOND DATA ELEMENT AND LEARNED FIRST DATA ELEMENT — S36a

OUTPUT INFORMATION (HIERARCHY, POSITION, SIMILARITY, OR THE LIKE) ABOUT SIMILARITY — S40a

END

FIG. 13
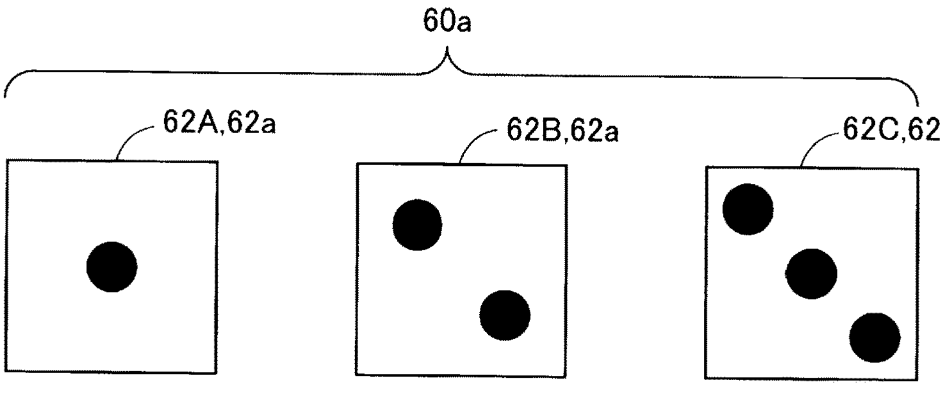
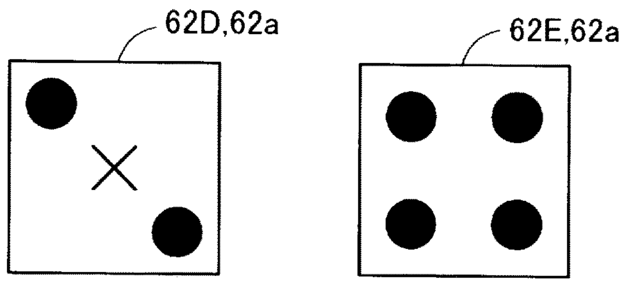
FIG. 14
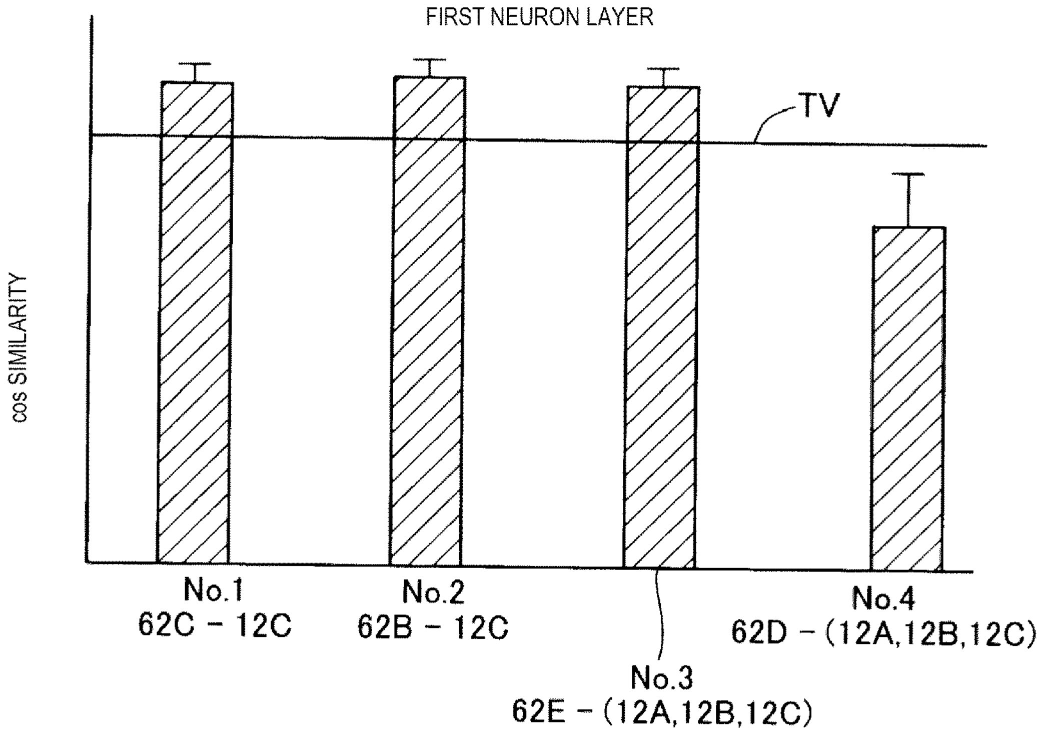

METHOD, APPARATUS, AND NON-TEMPORARY COMPUTER-READABLE MEDIUM THAT USES A VECTOR NEURAL NETWORK

The present application is based on, and claims priority from JP Application Serial Number 2020-094200, filed May 29, 2020, and JP Application Serial Number 2020-094205, filed May 29, 2020, the disclosures of which are hereby incorporated by reference herein in their entirety.

BACKGROUND

1. Technical Field

The present disclosure relates to a technology using a vector neural network.

2. Related Art

In the related art, an algorithm model including a vector as an input and output element is known in machine learning (U.S. Pat. No. 5,210,798, International Publication No. 2019/083553, Geoffrey Hinton, Sara Sabour, Nicholas Frosst, "MATRIX CAPSULES WITH EM ROUTING", published as a conference paper at ICLR 2018, and Sara Sabour, Nicholas Frosst, Geoffrey E. Hinton, "Dynamic Routing Between Capsules", 31st Conference on Neural Information Processing Systems (NIPS 2017)).

In the technology of International Publication No. 2019/083553, an algorithm model of a capsule network type is disclosed. A capsule network is an algorithm model having a unit called a capsule at a node of a network. A typical capsule in a capsule network inputs and outputs pose and activation. The pose indicates a state of the capsule that output the pose and takes a form of a vector or a matrix. In addition, the activation is a scalar quantity indicating an activity of the capsule that outputs the activation. The pose and the activation are determined by an output from a plurality of capsules in a previous layer, for example, by the pose and the activation by using a technique called dynamic routing by agreement.

In a broader sense, the capsule network type algorithm model can be considered as a vector neural network (VNN) type algorithm model of which unit is a vector neuron that inputs and outputs a vector and a matrix. Also, in the vector neural network type algorithm model, activation that can be treated as an activity of the vector neuron can be defined. In the vector neural network, its information propagation rule is not limited to the dynamic routing by agreement, and any technique can be used.

For example, as a propagation rule, there is a method of weighting a total sum u of votes from each vector neuron by a softmax value of a norm. The vector neural network has a plurality of vector neurons in each layer, and calculates the vector neuron in a next layer from a vector neuron group in the previous layer set by a kernel size and a stride. In a final layer, a class corresponding to the vector neuron that maximizes the activation is output. Note that the final layer has the same number of vector neurons as that of target class discriminations. The class discrimination is also called label discrimination. The vector neuron is also simply called neuron.

When the class discrimination is performed by using the VNN, a result of the class discrimination is output, but a discrimination basis of the output class is unknown, and it is difficult to know the discrimination basis.

SUMMARY (1) According to a first aspect of the present disclosure, there is provided a method of causing one or more processors to execute. The method of causing one or more processors to execute: performing learning of a model that is an algorithm of a vector neural network type to reproduce correspondence between a plurality of first data elements included in a first data set and a pre-label corresponding to each of the plurality of first data elements, in which the model has one or more neuron layers, each of the one or more neuron layers has one or more neuron groups, each of the one or more neuron groups has one or more neurons, and each of the one or more neurons outputs first intermediate data based on at least one of a first vector and a first activation; and inputting the first data set into the learned model and acquiring the first intermediate data output by the one or more neurons by being associated with the neuron.

(2) According to a second aspect of the present disclosure, there is provided a method of causing one or more processors to execute using a model learned in advance. The model is learned to reproduce correspondence between a plurality of first data elements included in a first data set and a pre-label corresponding to each of the plurality of first data elements, the model uses an algorithm of a vector neural network type and has one or more neuron layers, each of the one or more neuron layers has one or more neuron groups, each of the one or more neuron groups has one or more neurons, and each of the one or more neurons outputs first intermediate data based on at least one of a first vector and a first activation. The method includes: inputting the first data set into the learned model, and acquiring the first intermediate data output by the one or more neurons by being associated with the neuron; inputting a second data element into the model, and acquiring second intermediate data based on at least one of a second vector and a second activation included in the one or more neurons, for each of the one or more neuron layers; and calculating a similarity between the first intermediate data and the second intermediate data, for the one or more neuron layers.

(3) According to a third aspect of the present disclosure, an apparatus is provided. The apparatus includes: one or more processors. The one or more processors is configured to execute: performing learning of a model that is an algorithm of a vector neural network type to reproduce correspondence between a plurality of first data elements included in a first data set and a pre-label corresponding to each of the plurality of first data elements, in which the model has one or more neuron layers, each of the one or more neuron layers has one or more neuron groups, each of the one or more neuron groups has one or more neurons, and each of the one or more neurons outputs first intermediate data based on at least one of a first vector and a first activation; and inputting the first data set into the learned model and acquiring the first intermediate data output by the one or more neurons by being associated with the neuron.

(4) According to a fourth aspect of the present disclosure, an apparatus is provided. The apparatus includes: a storage device that stores a model learned to reproduce correspondence between a plurality of first data elements included in a first data set and a pre-label corresponding to each of the plurality of first data elements, in which the model uses an algorithm of a vector neural network type and has one or more neuron layers, each of the one or more neuron layers has one or more neuron groups, each of the one or more neuron groups has one or more neurons, and each of the one or more neurons outputs first intermediate data based on at least one of a first vector and a first activation; and one or more processors. The one or more processors is configured to execute: inputting the first data set into the learned model and acquiring the first intermediate data output by the one or more neurons by being associated with the neuron; inputting a second data element into the model, and acquiring second intermediate data based on at least one of a second vector and a second activation included in the one or more neurons, for each of the one or more neuron layers; and calculating a similarity between the first intermediate data and the second intermediate data, for the one or more neuron layers.

(5) According to a fifth aspect of the present disclosure, a non-temporary computer-readable medium storing instructions for causing one or more processors to execute: performing learning of a model that is an algorithm of a vector neural network type to reproduce correspondence between a plurality of first data elements included in a first data set and a pre-label corresponding to each of the plurality of first data elements, in which the model has one or more neuron layers, each of the one or more neuron layers has one or more neuron groups, each of the one or more neuron groups has one or more neurons, and each of the one or more neurons outputs first intermediate data based on at least one of a first vector and a first activation; and inputting the first data set into the learned model and acquiring the first intermediate data output by the one or more neurons by being associated with the neuron.

(6) According to a sixth aspect of the present disclosure, a non-temporary computer-readable medium storing instructions for causing one or more processors to execute using a model learned in advance. The model is learned to reproduce correspondence between a plurality of first data elements included in a first data set and a pre-label corresponding to each of the plurality of first data elements, the model uses an algorithm of a vector neural network type and has one or more neuron layers, each of the one or more neuron layers has one or more neuron groups, each of the one or more neuron groups has one or more neurons, and each of the one or more neurons outputs first intermediate data based on at least one of a first vector and a first activation. The instructions causes one or more processors to further execute: inputting the first data set into the learned model and acquiring the first intermediate data output by the one or more neurons by being associated with the neuron; inputting a second data element into the model, and acquiring second intermediate data based on at least one of a second vector and a second activation included in the one or more neurons, for each of the one or more neuron layers; and calculating a similarity between the first intermediate data and the second intermediate data, for the one or more neuron layers.

BRIEF DESCRIPTION OF THE DRAWINGS

FIG. 1 is a diagram for explaining a discrimination system of a learning stage.

FIG. 5 is a diagram for explaining a setting method of a model of a vector neural network type.

FIG. 7 is a diagram for explaining a discrimination system at a discrimination stage.

FIG. 10 is a flowchart of first explanatory processing.

FIG. 12 is a flowchart of second explanatory processing.

FIG. 13 is a diagram for explaining a second data element.

FIG. 14 is a graph illustrating a cosine similarity in a first neuron layer.

DESCRIPTION OF EXEMPLARY EMBODIMENTS

A. Embodiments

Figure 2:
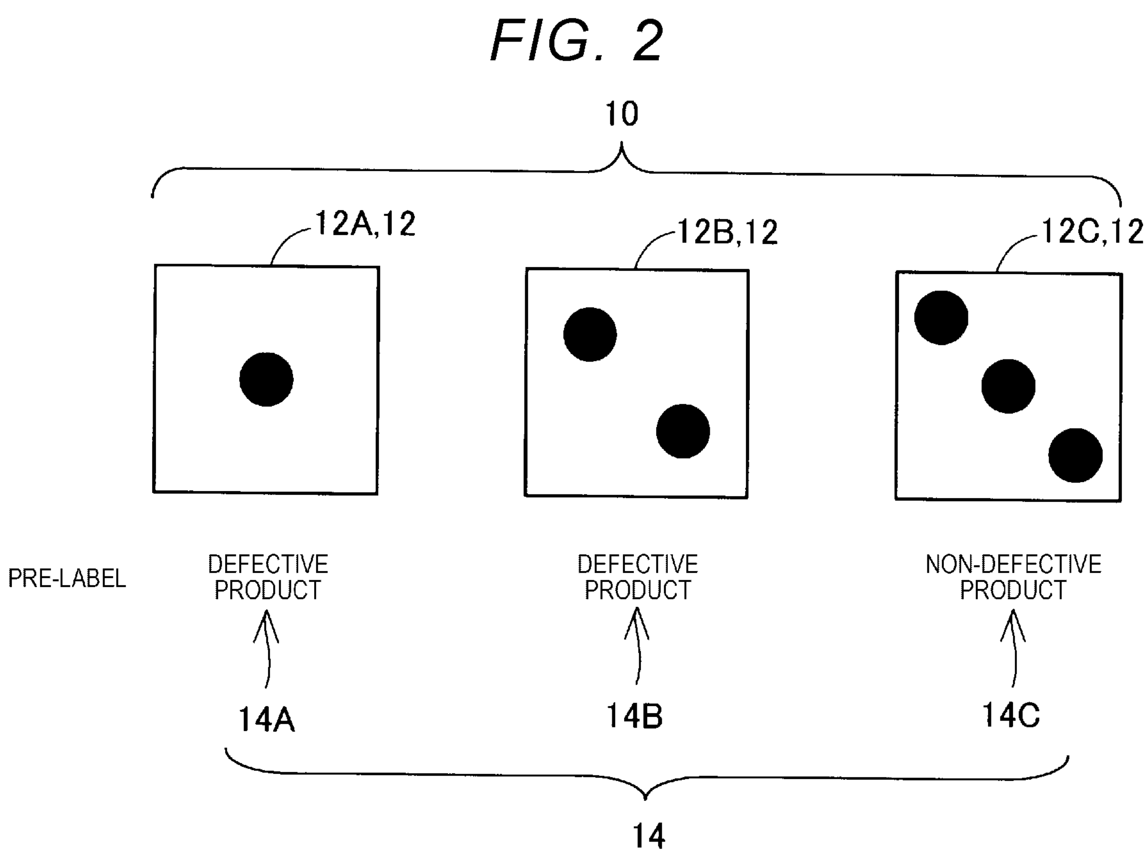
FIG. 2 is a diagram for explaining a first data set and a pre-label.

FIG. 1 is a diagram for explaining a discrimination system 100 of a learning stage. FIG. 2 is a diagram for explaining a first data set 12 and a pre-label 14. The discrimination system 100 illustrated in FIG. 1 represents a stage of performing learning of a model 30 by using a vector neural network. The discrimination system 100 includes a discrimination device 20 and a data interface for exchanging data with an external device. The data interface is not limited, but is preferably a USB adapter, a wired or wireless LAN adapter, or the like.

In the present embodiment, the first data set 12 is stored in a storage device of the discrimination device 20 from the external device via the data interface. The first data set 12 is used for performing the learning of the model 30. The first data set 12 has first data elements 12A, 12B, and 12C, and pre-labels 14 corresponding to the first data elements 12A, 12B, and 12C. Of the pre-labels 14, a label corresponding to the first data element 12A is also called a pre-label 14A, a label corresponding to the first data element 12B is also called a pre-label 14B, and a label corresponding to the first data element 12C is also called a pre-label 14C. The first data set 12 includes a plurality of first data elements 12A, 12B, and 12C acquired by sensors. The sensors are various sensors such as an RGB camera, an infrared camera, a depth sensor, a microphone, an acceleration sensor, and a gyro sensor, and are cameras in the present embodiment.

As illustrated in FIG. 2, each of the first data elements 12A to 12C is a dice as a target of a different type imaged by the camera. The first data element 12A is a data element obtained by imaging a dice with one spot on an entire surface by the camera. The first data element 12B is a data element obtained by imaging a dice with two spots on the entire surface by the camera. The first data element 12C is a data element obtained by imaging a dice with three spots on the entire surface by the camera. 1000 pieces of each of the first data elements 12A to 12C, which are image data, are prepared. Each of the first data elements 12A to 12C has an image size of 32×32 pixels. Further, in the 1000 pieces of each of first data elements 12A to 12C, a position of the spot of the dice is varied by a maximum of ±2 pixels, and a size of the spot of the dice is varied by a maximum of ±2 pixels. The first data elements 12A to 12C used for learning of the model 30 and second data elements, described later, of which labels are discriminated by the model 30 have a hierarchical property in feature. Having the hierarchical property in feature means that when a data region of interest is gradually increased from a minute region, different features appear for each region. For example, as the feature, a texture of the region, a shape appearing in the region, a disposition of each element appearing in the region, an overall configuration appearing in the region, or the like corresponds to each layer. The hierarchical property of the feature is a feature structure commonly found in many data, and the content of the present disclosure using the model 30 is highly versatile.

The pre-label 14 is stored in a first input data set 10 in association with each of the first data elements 12A to 12C. The pre-label has a non-defective product label as a first pre-label and a defective product label as a second pre-label. The pre-label 14 may be simply referred to as the label 14. The defective product label is associated with the first data element 12A as the pre-label. The defective product label is associated with the first data element 12B as the pre-label. The non-defective product label is associated with the first data element 12C as the pre-label. That is, the model 30 in the present embodiment is used in a case of manufacturing a product in which three spots are printed or engraved on each surface of the cube, and discriminates between the non-defective product and the defective product.

The discrimination device 20 illustrated in FIG. 1 is an electronic computer such as a personal computer. The discrimination device 20 includes a storage device 22, a processor 24, and an output section 26. The storage device 22 includes a non-volatile storage medium 23 as a non-temporary storage medium such as a flash memory or EEPROM, and a DRAM as a main memory. The storage device 22 stores the model 30 and a collection data element 32 generated by using the input first input data set 10. Further, the storage device 22 stores various programs for controlling an operation of the discrimination device 20.

The processor 24 realizes various functions by executing various programs stored in the storage device 22. The processor 24 functions as, for example, a learning section, a first acquisition section, a second acquisition section, or a calculation section. In another embodiment, at least apart of various functions may be realized by a hardware circuit. Here, in the present specification, the “processor” is a term including a CPU, a GPU, and a hardware circuit.

The output section 26 is used to output various information. The output section 26 is, for example, a liquid crystal monitor. As various information, for example, information about the label of the data element discriminated by using the learned model 30 is displayed. The output section 26 may be a speaker that outputs audio instead of a display device such as the liquid crystal monitor.

The model 30 is an algorithm model of a vector neural network type, and is a hierarchical type having a plurality of layers. The model 30 is a network capable of omitting dynamic routing executed in the capsule network described in International Publication No. 2019/083553, Geoffrey Hinton, Sara Sabour, Nicholas Frosst, “MATRIX CAPSULES WITH EM ROUTING”, published as a conference paper at ICLR 2018, and Sara Sabour, Nicholas Frosst, Geoffrey E. Hinton, “Dynamic Routing Between Capsules”, 31st Conference on Neural Information Processing Systems (NIPS 2017). The model 30 does not require iterative processing required for the dynamic routing. A difference between the capsule network algorithm and the vector neural network algorithm is described below.

An outline of the algorithm for dynamic routing of the capsule network is expressed by the following equations (1) to (5).

[Math. 1]

$$V_{ij} = W_{ij} X_i \tag{1}$$

[Math. 2]

$$u_j = \frac{1}{Z} \sum_i R_{ij} V_{ij} \tag{2}$$

[Math. 3]

$$a_j = F(a_i, R_{ij}, V_{ij}) \tag{3}$$

[Math. 4]

$$R_{ij} = G(a_j, u_j, V_{ij}) \tag{4}$$

[Math. 5]

$$X_j = u_j \tag{5}$$

In the above equations (1) to (5), $X_i$ is an output of the capsule in a layer L, and $X_j$ is an output of a capsule in the next layer L+1. Further, $W_{ij}$ is a transformation matrix for obtaining a predicted value of $X_j$ from $X_i$, and is optimized in the learning processing of the capsule network. Also, $a_i$ is an activation value of the capsule in the layer L. $R_{ij}$ is called a routing factor and is initialized with a constant at the start of the algorithm. $R_{ij}$ is an element that determines which capsule in the previous layer outputs to which capsule in the next layer. Dynamic routing means that $R_{ij}$ is dynamically changed for each data element, and an optimum value is determined by using a technique of stochastic statistics. The “F” and “G” described in the equations (3) and (4) are expressions that abstract the stochastic statistical processing. When the equations (3) and (4) are considered by, for example, an expectation-maximization algorithm (EM algorithm), it can be associated with “F” representing an M step and “G” representing an E step. Further, the calculation is repeatedly executed until $R_{ij}$ converges from the equation (4) to the equation (2). In the capsule network, iterative calculation of about 2 to 3 times is recommended.

Next, the output determination algorithm of the vector neural network used in the model 30 of the present embodiment is described below.

[Math. 6]

$$v_{ij} = W_{ij}^{i} M_i^{L} \tag{6}$$

[Math. 7]

$$\mu_j = \sum_i v_{ij} \tag{7}$$

[Math. 8]

$$a = softmax(\|\mu_j\|) = \frac{\exp(\beta\|\mu_j\|)}{\sum_k \exp(\beta\|\mu_k\|)} \tag{8}$$

[Math. 9]

$$M_j^{L+1} = a_j \times \frac{1}{\|\mu_j\|}\mu_j \tag{9}$$

Here, the element Ema in which “i” and “L” are added to “M” in the above equation (6) represents an output of the i-th vector neuron in the layer L. The element Emb denoted by adding “ij” and “L” to “W” in the equation (6) is a transformation matrix for calculating, from the element Ema, a predicted value $v_{ij}$ with respect to a direction of the element on the left side of the above equation (9), which is the output of the j-th vector neuron of the layer L+1, and is a learning target by a stochastic gradient descent method. $u_j$ is a total sum of the predicted value $v_{ij}$ of the elements Ema from all vector neurons in the layer L. i takes 1 to N, and N is an integer. The norm of $u_j$ has a large predicted value, and the more the vectors $v_{ij}$ are aligned, the larger it becomes. By a Softmax function of equation (8), the norm of $u_j$ for all vector neurons of the layer L+1 is converted into an accuracy a that is a standardized value. Here, β is a parameter for adjusting the influence on the accuracy of the size of the norm as described in the above equation (8), and this time, it is executed with β=1. Further, in the equation (8), "k" takes 1 to N. The accuracy a is an element corresponding to activation in the capsule network. Therefore, the accuracy a is also called the activation a. j takes a value from 1 to M. Here, "M" is an integer. Since the information of the accuracy a is integrated into the element Emb by the equation (9), it is not explicitly output from the vector neuron to the next vector neuron. According to the equation (9), only the information about the direction of $u_j$ is taken out and weighted by the relative accuracy a in the layer L+1, and the element Ema is determined.

For the element Emb, 2-norm is incorporated into a loss function so as not to take an extremely large value in the learning processing. Here, the norm of the element Emb is defined by using the product with an appropriate vector, and when the element Ema is used as the vector, it is expressed by the following equation (10).

[Math. 10]

$$\|W_{ij}^L\|_2 = \max_{M_i^L \neq 0} \times \frac{\|W_{ij}^L M_i^L\|_2}{\|M_i^L\|_2} \rightarrow \|W_{ij}^L\|_2 \|M_i^L\|_2 \geq \|W_{ij}^L M_i^L\|_2 = \|v_{ij}\|_2 \quad (10)$$

Since the size of the output M, which is a vector of the vector neuron, is weighted by the relative accuracy a of each layer, a vote from information having a high accuracy a has a great influence.

Figure 3:
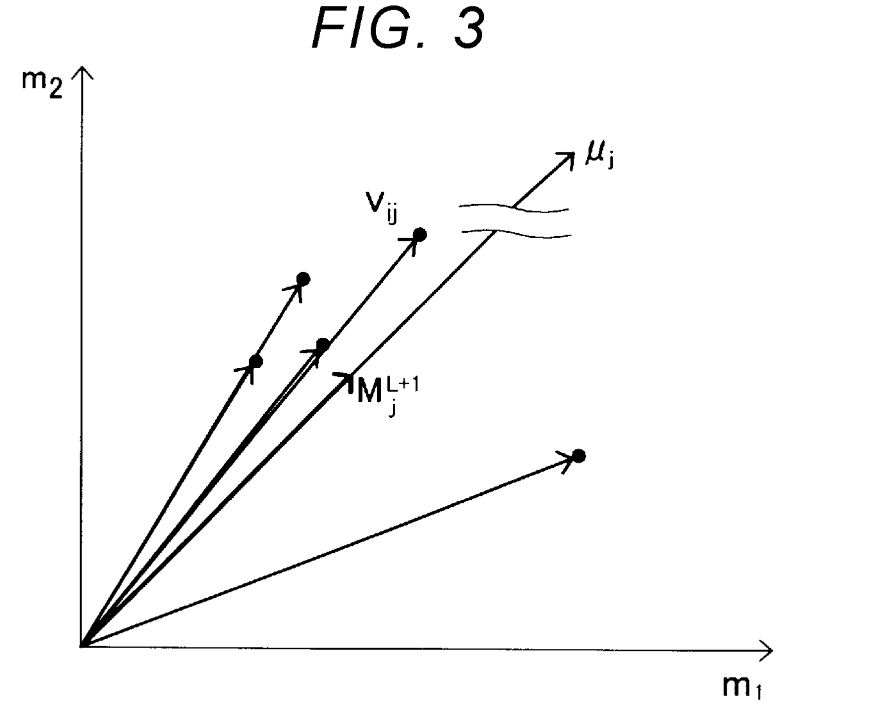
FIG. 3 is a first diagram conceptually illustrating a determination of vector neurons by a predictive vote.
Figure 4:
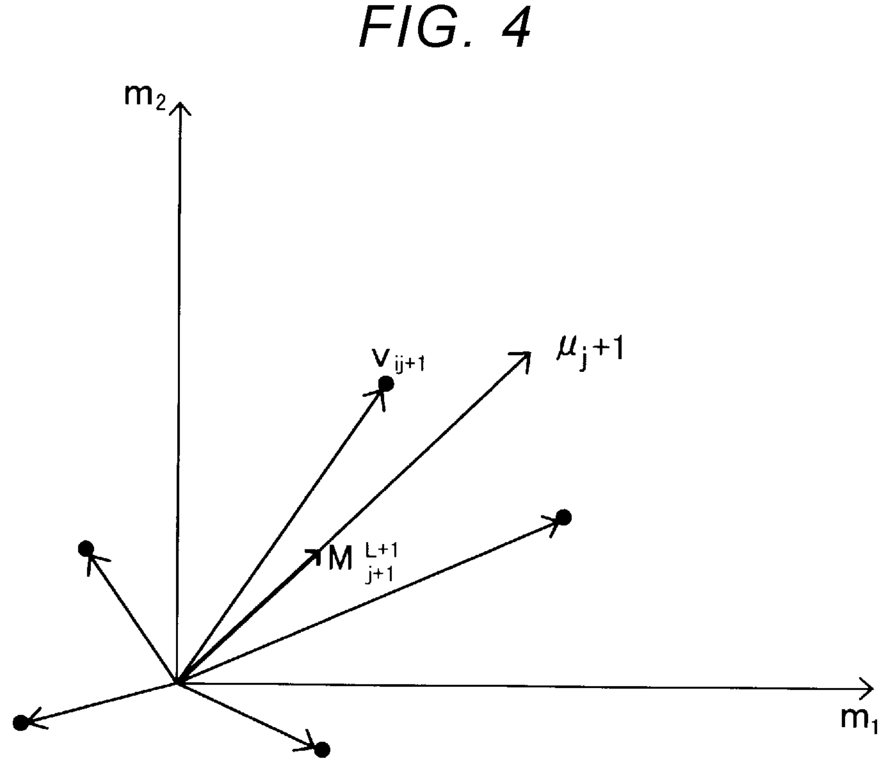
FIG. 4 is a second diagram conceptually illustrating a determination of vector neurons by a predictive vote.

FIG. 3 is a first diagram conceptually illustrating the determination of the vector neuron by a predictive vote. FIG. 4 is a second diagram conceptually illustrating the determination of the vector neuron by a predictive vote. In FIGS. 3 and 4, the number of dimensions of the vector neuron is set to 2 of dimension m1 and dimension m2 for easy understanding. As illustrated in FIG. 3, predictive votes having aligned directions lead to a high accurate output M. On the other hand, as illustrated in FIG. 4, predictive votes having no-aligned direction lead to a low accurate output M.

Figure 5:
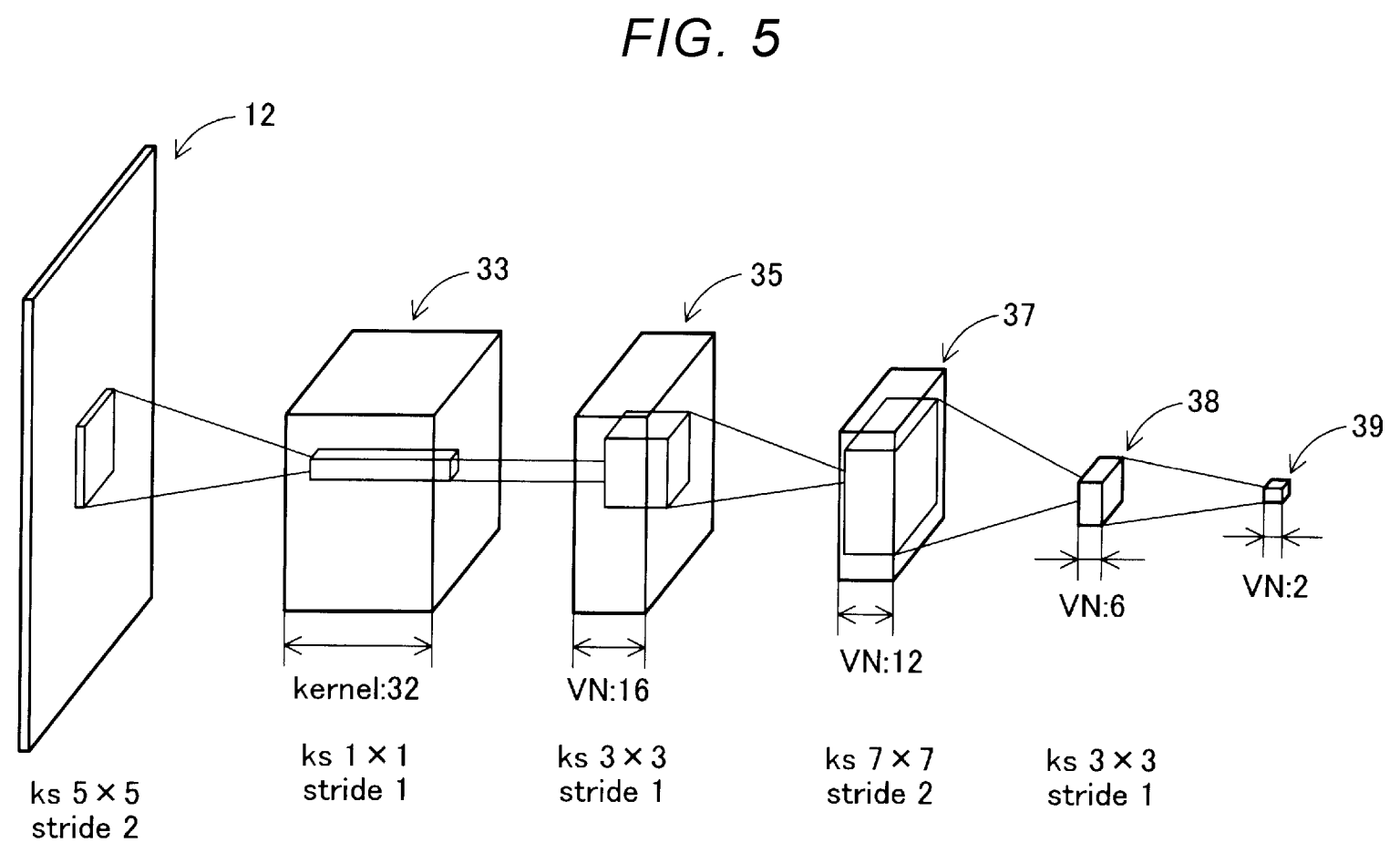

FIG. 5 is a diagram for explaining a setting method of the model 30 of the vector neural network type. The model 30 includes a convolution layer 33, a primary neuron layer 35, a first neuron layer 37, a second neuron layer 38, and a classification neuron layer 39 that is a final layer in this order from an input first data set 12 side. The number of hierarchies of the model 30 is appropriately changed according to the type of the input data element. In the present embodiment, the neuron layer has a hierarchy structure configured of four layers 35, 37, 38, and 39. The primary neuron layer 35, the first neuron layer 37, the second neuron layer 38, and the classification neuron layer 39 are arranged in this order from a lower side. The vector M and the activation a of each neuron in the neuron layer on an upper side is determined by using the neuron group of the previous layer, which is the lower layer configured of one or more neurons set by the kernel and stride. The vector M included in each neuron is 16 dimensions in the present embodiment.

By applying a 5×5 kernel with stride "2" to each of the data elements 12A to 12C (input images) of the first data set 12, a partial range that gives the output to one node of the convolution layer 33 is determined within a range of the data elements. The number of kernels applied to each of the data elements 12A to 12C is 32. Therefore, the convolution layer 33 is configured such that a vertical axis, which is a first axis, and a horizontal axis, which is a second axis orthogonal to the first axis, each have a region divided into 14. Further, the number of channels indicating the number of the convolution layers 33 in a depth direction is configured of 32, which is the same number as the number of kernels. The "partial range" is one region specified by a position on the vertical axis and a position on the horizontal axis on the data element. However, as is clear from the following explanation, a size of the "partial range" on the data element is different depending on the neuron corresponding to the "partial range" or which of the neuron layers 35, 37, 38, and 39 the partial region Rx belongs. The "partial region" is a region specified by a position on the vertical axis and a position on the horizontal axis in the neuron layer. Each "partial region" in the neuron layer has dimensions of "Height"×"Width"×"Depth" corresponding to the vertical axis, the horizontal axis, and the channel. In the present embodiment, the number of neurons included in one "partial region" is "1×1×number of depths". In the present specification, the numerical values of "35", "37", "38", and "39" are substituted for "x" in the notation "partial region Rx" depending on the neuron layers 35, 37, 38, and 39. For example, the partial region R35 indicates a region in the neuron layer 35.

By applying the 1×1×32 kernel to the convolution layer 33 with the stride "1", from among the partial regions R33 of the convolution layer 33, the partial region R33 giving an output to one neuron of the primary neuron layer 35 is determined. Here, since 16 types of kernels are used with the same size and the same stride, the number of neurons corresponding to one partial region R33 of the convolution layer 33 is 16 in the primary neuron layer 35. A transformation matrix is used to generate the output from the node of the convolution layer 33 to the neuron of the primary neuron layer 35, and the output determination algorithm represented by the above equations (6) to (10) is not used. The kernel dimension for convoluting into the neuron layer may be expressed as "Height"×"Width"×"Depth"×"number of vector M elements" when the number of channels and the number of neuron elements are also taken into consideration. According to this expression, the dimensions of the kernel used for convolution from the convolution layer 33 to the primary neuron layer 35 are 1×1×32×16.

By applying a 3×3×16 kernel to the primary neuron layer 35 with stride "1", from among the partial regions R35 of the primary neuron layer 35, the partial region(s) R35 giving an output to the neuron included in one partial region R37 of the first neuron layer 37 is determined. Here, since 12 types of kernels are used with the same size, the same dimension, and the same stride, the number of neurons included in the partial region R37 of the first neuron layer 37 is 12. The output determination algorithms represented by the above equations (6) to (10) are used to generate the output from the neuron of the primary neuron layer 35 to the neuron of the first neuron layer 37. Here, the kernel applied to the lower layer 35 is also expressed as specifying 3×3×16 neurons of the lower layer 35 used to determine one neuron of the upper layer 37 according to the routing-by-agreement. This also applies to the following explanation. In the present embodiment, a set configured of one or more neurons for one partial region Rx is also referred to as a neuron group. That is, the neuron group has one or more neurons arranged in the depth direction.

By applying a 7×7×12 kernel to the first neuron layer 37 with stride "2", from among the partial regions R37 of the first neuron layer 37, the partial region(s) R37 giving an output to one partial region R38 of the second neuron layer 38 is determined. Here, since six types of kernels are used with the same size, the same dimension, and the same stride, the number of neurons included in the partial region R38 of the second neuron layer 38 is 6. When generating the neurons of the second neuron layer 38 from the neurons of the first neuron layer 37, the output determination algorithms represented by the above equations (6) to (10) are used.

By applying a 3×3×6 kernel to the second neuron layer 38 with stride "1", from among the partial regions R38 of the second neuron layer 38, the partial region (s) R38 giving an output to one partial region R39 of the classification neuron layer 39 is determined. Here, since two types of kernels are used with the same size, the same dimension, and the same stride, the number of neurons included in the partial region R39 of the classification neuron layer 39 is 2. When the neurons of the classification neuron layer 39 are generated from the neurons of the second neuron layer 38, the output determination algorithms represented by the above equations (6) to (10) are used.

The classification neuron layer 39 that is the final layer is configured of one partial region R39. The classification neuron layer 39 classifies the data elements input into the model 30, into predetermined labels. In the present embodiment, in the classification neuron layer 39 in which predetermined labels are the non-defective product label and the defective product label, a label corresponding to a neuron of two neurons, having the maximum activation a is output. The label output from the classification neuron layer 39 is output by the output section 26 by being controlled by the processor 24.

In FIG. 5, one partial region R35 of the primary neuron layer 35 corresponds to a partial range of 5×5 pixels of data elements 12A to 12C. Further, one partial region R37 of the first neuron layer 37 corresponds to a partial range of 9×9 pixels of the data elements 12A to 12C. Further, the partial region R38 of the second neuron layer 38 corresponds to a partial range of 21×21 pixels of the data elements 12A to 12C. Further, the partial region R39 of the classification neuron layer 39 corresponds to a partial range of 29×29 pixels of the data elements 12A to 12C.

Figure 6:
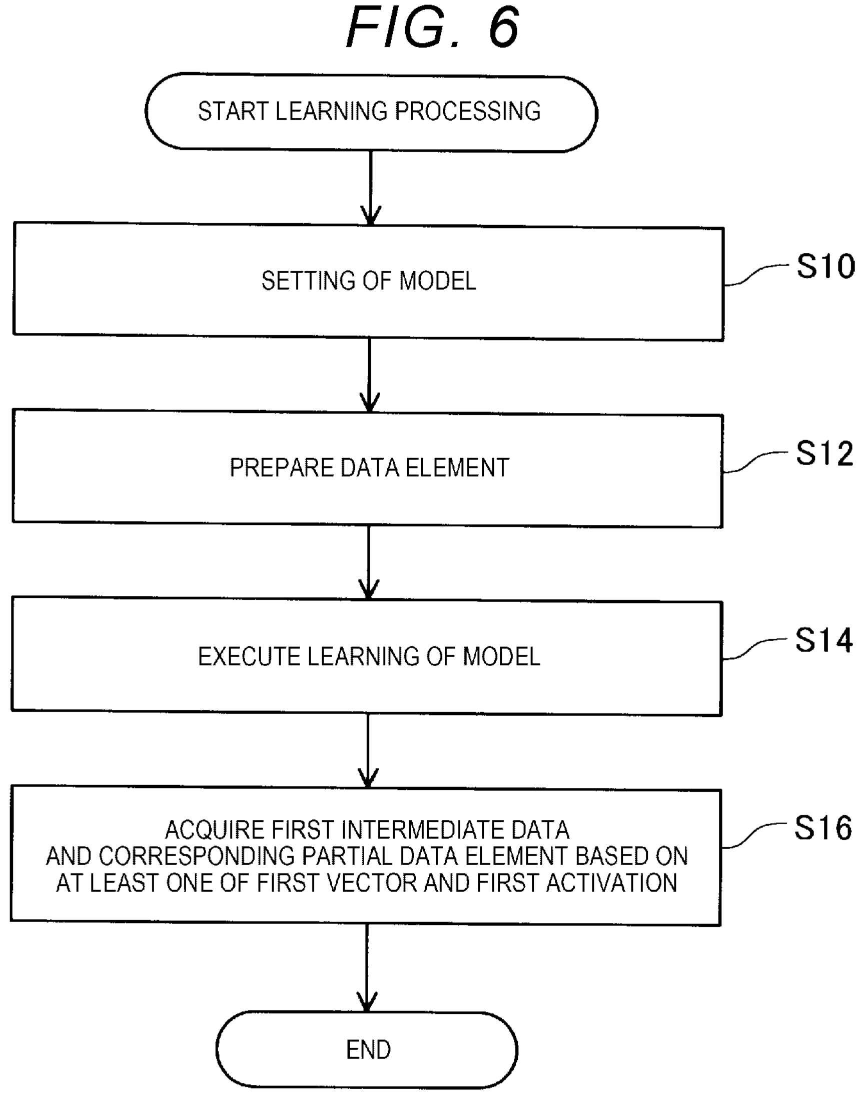
FIG. 6 is a flowchart illustrating learning processing executed in a learning stage of a model.

FIG. 6 is a flowchart illustrating learning processing executed in the learning stage of the model 30. First, in step S10, parameters of the model 30 are set. In step S10, as described with reference to FIG. 5, the number of hierarchies and the size and/or the stride of the kernel applied between the layers are set.

Next, in step S12, the first data set 12 to be learned by the model 30 is prepared. The order of steps S10 and S12 is not limited to the above, and step S12 may be executed before step S10.

Next, in step S14, each of the first data elements 12A to 12C of the first data set 12 is sequentially input into the model 30. The model 30 is learned to reproduce the correspondence between each of the data elements 12A to 12C of the first data set 12 and the pre-label corresponding to each of the data elements 12A to 12C. The processor 24 performs the learning of the model 30 by using, for example, an algorithm of a mini-batch gradient descent method. In the present embodiment, the processor 24 performs the learning of the model 30 by using the algorithm of the mini-batch gradient descent method in which a size of the mini-batch, which is a subset of the data elements, is set to "32" and an epoch is set to "20000". As a result of the learning, a correct answer rate of the model 30 was 100%.

In step S16, the processor 24 re-inputs the first data set 12 into the model 30 learned in step S14, and the following is executed for each of the first neuron layer 37, the second neuron layer 38, and the classification neuron layer 39 which are the neuron layers. That is, the processor 24 acquires the first intermediate data by being associated with the partial range which is the partial range on the first data elements 12A to 12C and to which each neuron corresponds based on at least one of the first activation a1 and the first vector M1 included in each neuron of each of the layers 37, 38, and 39. The storage device 22 stores a relative position of the associated first intermediate data and the associated partial range. The associated partial range itself may be stored in the storage device 22. The partial range on the first data elements 12A to 12C and corresponding to each neuron is also referred to as a first partial data element. Further, in the following, the stored first intermediate data and first partial data element are also referred to as collection data element 32. In another embodiment, in the same manner as in each of the layers 37, 38, and 39, also in the primary neuron layer 35, the first intermediate data may be acquired by being associated with the first partial data element. Further, when the partial range information indicating the region of the first partial data element is not included as the information about the similarity described later, the first intermediate data may not be associated with the first partial data element. It is not always necessary to acquire the first intermediate data from all the neuron layers. For example, the first intermediate data may be acquired only from the second neuron layer 38, or may be acquired from a combination of several layers. This also applies to the second intermediate data described below. Further, in another embodiment, by dividing the first data set 12 used for performing the learning of the model 30 in step S14 into two, in step S14, it is divided into a group of the first data elements 12A, 12B, and 12C used for performing the learning of the model 30 and a group of the first data elements 12A, 12B, and 12C not used for performing the learning. In step S14, only one group performs the learning of the model 30, and in step S16, the first intermediate data may be generated by using two groups. In short, as long as the same pre-labels 14A, 14B, and 14C as the pre-labels 14A, 14B, and 14C of the first data elements 12A, 12B, and 12C used for performing the learning of the model 30 are given, in step S16, data for generating the intermediate data is not limited only to the first data elements 12A, 12B, and 12C used for performing the learning of the model 30.

As described above, according to the method executed by the processor 24, the first intermediate data can be acquired by step S16 based on at least one of the first activation a1 and the first vector M1 included in the neuron. Therefore, when the data element of the discrimination target is input into the model 30, the second intermediate data is acquired based on at least one of the second activation a2 and the second vector M2 included in the neuron. The similarity between a feature spectrum generated from the first intermediate data and a feature spectrum generated from the second intermediate data can be calculated. The second intermediate data may be the second vector M2 itself or the second activation a2 itself, or may be data which is data-processed such as weighting for the second vector M2 or the second activation a2. In the present embodiment, the second intermediate data is configured of the second vector M2 and the second activation a2. In another embodiment, the first intermediate data and the second intermediate data each may be the feature spectrum. The details of the feature spectrum will be described later. By calculating the similarity, for example, a neuron of which the similarity is less than a predetermined threshold value can be specified. Therefore, a discrimination basis of the input data element by using the model 30 can be output. Details of the output aspect of the discrimination basis will be described later.

Figure 8:
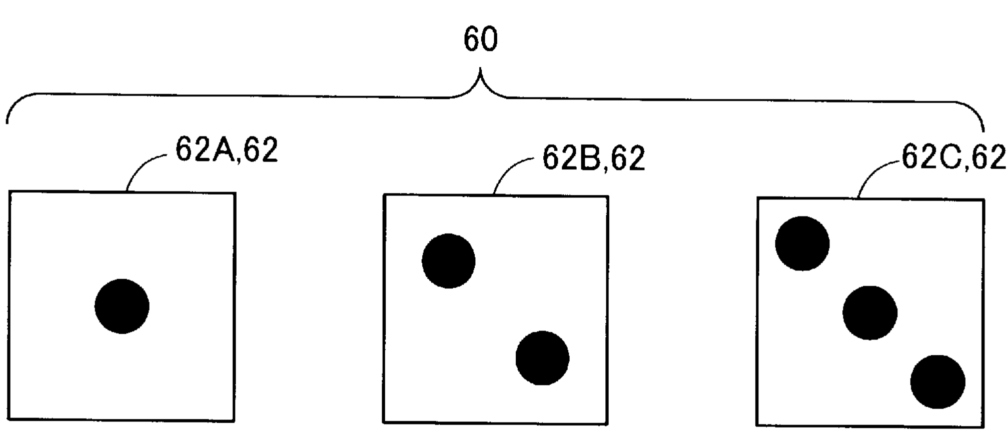
FIG. 8 is a diagram for explaining a second data set.

FIG. 7 is a diagram for explaining a discrimination system 100 of the discrimination stage. FIG. 8 is a diagram for explaining a second data set 62. A difference between the discrimination system 100 of FIG. 7 and the discrimination system 100 of FIG. 1 is that the second input data set 60 is used as the data element to be input into the model 30.

As illustrated in FIG. 7, the second input data set 60 has the second data set 62. As illustrated in FIG. 6, the second data set 62 is second data elements 62A to 62C indicating images acquired by imaging one surface by a camera on each of a plurality of manufactured dices. The size of the second data elements 62A to 62C is, for example, 32×32 pixels, which is the same as when performing the learning of the model 30. Further, 1100 pieces of each of the second data elements 62A to 62C are prepared, and the position of the spot of the dice is varied by a maximum of ±2 pixels and the size of the spot on the dice is varied by a maximum of ±2 pixels.

By inputting the second data elements 62A to 62C one by one into the learned model 30, the class discrimination, that is, the label is discriminated. For example, when the second data element 62A indicating one spot or the second data element 62B indicating two spots is input into the model 30, it is discriminated that the product is defective, and when the second data element 62C indicating three spots is input, it is discriminated that the product is non-defective. Further, in the present embodiment, the processor 24 generates the discrimination basis for discriminating the label, and causes the output section 26 to display the discrimination basis together with the discriminated label. The method of generating the discrimination basis will be described later.

Figure 9:
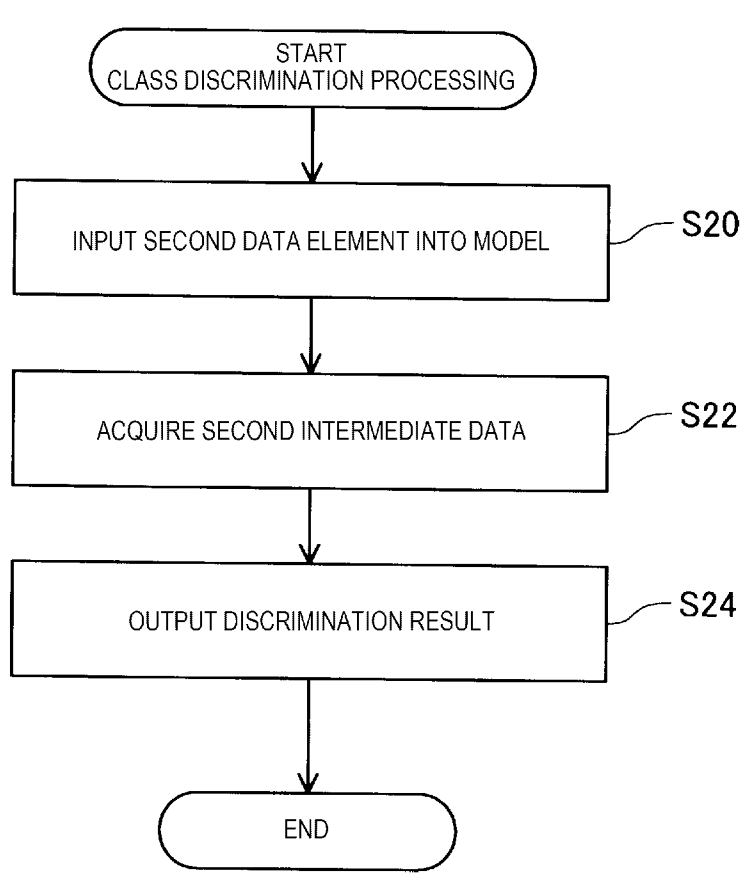
FIG. 9 is a flowchart of class discrimination processing of a second data set.

FIG. 9 is a flowchart of class discrimination processing of the second data set 62. First, in step S20, the processor 24 inputs each of the second data elements 62A to 62C into the model 30 learned by using the first data set 12, and executes the class discrimination. Next, in step S22, the processor 24 calculates, that is, derives a state of the model 30, that is, the second activation a2 as the activation a of two neurons of the classification neuron layer 39 for each of the input second data elements 62A to 62C. Further, in step S22, the processor 24 acquires the second intermediate data from the model 30 for each of the second data elements 62A to 62C input into the model 30. Details of the acquisition of the second intermediate data will be described later with reference to step S30 in FIG. 10.

Next, in step S24, the processor 24 outputs, to the output section 26, as the discrimination result, the label corresponding to the neuron in which the second activation a2 of the classification neuron layer 39 is maximized based on the calculation result in step S22. The label discrimination result is not limited to the image information and may be any information that can be notified to the user. For example, the label discrimination result may be output as audio information. In this case, the output section 26 includes a speaker. In the following description, the label discrimination result is stored in the storage device 22 as a part of the collection data element 32.

As described above, the label can be easily discriminated by inputting the second data elements 62A to 62C into the model 30. Further, since the label discrimination result is output by the output section 26, the user can easily grasp the label discrimination result.

Figure 11:
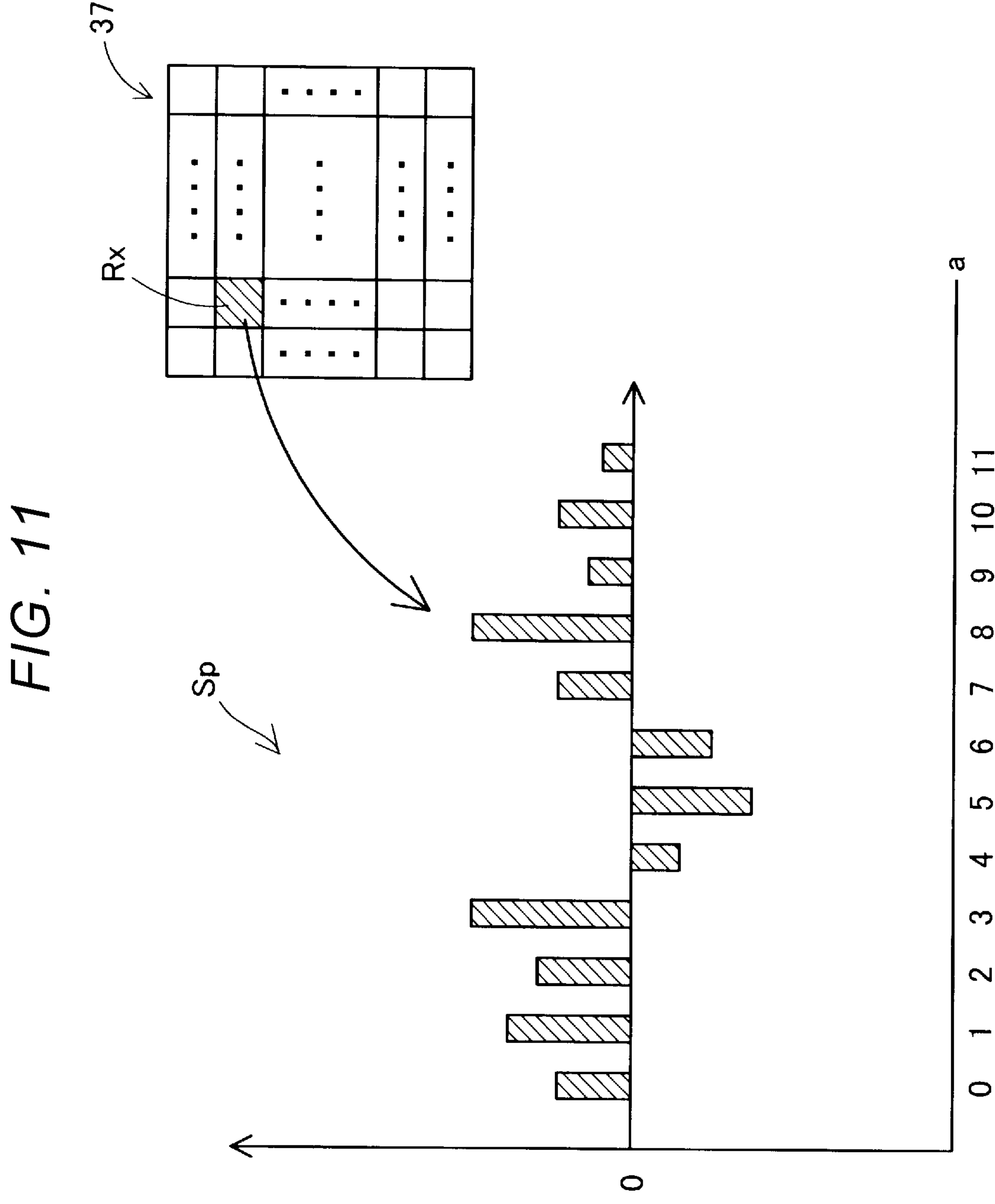
FIG. 11 is a graph for explaining a feature spectrum.

FIG. 10 is a flowchart of first explanatory processing. The first explanatory processing of FIG. 10 may be performed after the class discrimination processing of FIG. 9, or may be performed in parallel with the class discrimination processing of FIG. 9. The first explanatory processing is executed by the processor 24. The first explanatory processing is processing for comparing between the first data element 12C with which the non-defective product label stored in the collection data element 32 is associated and the input second data elements 62A to 62C, and explaining the discrimination basis why the product is discriminated to be non-defective, or why the product is not discriminated to be non-defective. The information generated by the first explanatory processing may be output together with the discrimination result in step S24 of FIG. 9. FIG. 11 is a graph for explaining a feature spectrum.

As illustrated in FIG. 10, first, in step S30, the processor 24 inputs the second data elements 62A to 62C into the learned model 30 one by one, and causes the model 30 to execute the class determination. When the class determination is completed, the second intermediate data output by each of the plurality of neurons is acquired and stored in the storage device 22. In the present embodiment, the second intermediate data includes the second vector M2 and the second activation a2. Step S30 is executed for at least each of the first neuron layer 37, the second neuron layer 38, and the classification neuron layer 39. Further, in step S30, the processor 24 stores the partial range which is the partial range on the second data elements 62A to 62C and corresponds to the second intermediate data, in the storage device 22 in association with the second intermediate data. In the present embodiment, step S30 is executed in step S22 of the class discrimination processing illustrated in FIG. 9. Next, in step S32, the processor 24 reads, from the storage device 22, the first intermediate data obtained when the class discrimination is executed on all of the first data elements 12C labeled to the non-defective products as the pre-labels. In the present embodiment, the first intermediate data is based on the first vector M1 and the first activation a1.

Next, in step S34, the processor 24 calculates a feature spectrum Sp of the second data elements 62A to 62C and a feature spectrum Sp of the first data element 12C of the non-defective product label. Specifically, the processor 24 calculates each feature spectrum Sp from the first intermediate data and the second intermediate data for each of the partial regions R37, R38, and R39 of each of the first neuron layer 37, the second neuron layer 38, and the classification neuron layer 39. In the present specification, the feature spectrum Sp may be represented by arranging one or more vectors M by normalizing for each partial region Rx in the neuron layer with an average of 0 and a variance of 1, or by standardizing by using a Softmax function. Further, the feature spectrum Sp may be represented by arranging each dimension or each element of the vectors M by being weighted by the corresponding activations a for each partial region Rx. The weighting can be realized, for example, by taking a product of the vector M and a value of the activation a corresponding to the vector M. Further, the feature spectrum Sp may be represented by arranging the values of activations a for each of the partial regions R37, R38, and R39 of the neuron layers 37, 38, and 39. Further, the arranged activations a may be normalized so that the average is 0 and the variance is 1. Further, the feature spectrum Sp may be represented by arranging the vectors M and/or the activations a for each of the partial regions R37, R38, and R39 of the neuron layers 37, 38, and 39. The feature spectrum Sp may be arranged by converting the vector M having a plurality of dimensions, 16 dimensions in the present embodiment, into one dimension without normalization.

The graph illustrated in FIG. 11 corresponds to the first neuron layer 37. In the first neuron layer 37, one partial region R37 has 12 neurons aligned in the depth direction. As an example, FIG. 11 illustrates an arrangement in which each activation a output by 12 neurons belonging to any one partial region R37 is normalized to the average of 0 and the variance of 1. The feature spectrum Sp in FIG. 11 has the plurality of normalized activations a as elements. In an example of the feature spectrum Sp illustrated in FIG. 11, a horizontal axis is the element numbers "0" to "11" for identifying the activation a of the corresponding neuron, and a vertical axis is a value of each activation a.

As illustrated in FIG. 10, next, in step S36, the processor 24 calculates the similarity based on the first intermediate data and the second intermediate data. Specifically, the processor 24 calculates the similarity between the feature spectrum Sp generated from the second intermediate data of the second data elements 62A to 62C and the feature spectrum. Sp generated from the first intermediate data of the first data element 12C of the non-defective product label in each of the first neuron layer 37, the second neuron layer 38, and the classification neuron layer 39. In the present embodiment, the calculation targets of the similarity are the partial regions Rx belonging to the same hierarchy. Specifically, the calculation targets are all partial regions Rx when the first data elements 12A to 12C are given to one partial region Rx when the second data elements 62A to 62C are given for each of the neuron layers 37, 38, and 39. Here, one partial region Rx in the neuron layers 37, 38, and 39 when the first data elements 12A to 12C are given, and one partial region Rx in the neuron layers 37, 38, and 39 when the second data elements 62A, 62B, and 62C are given are respectively correspond to a partial range on the first images which are the first data elements 12A to 12C, and a partial range on the second images which are the second data elements 62A to 62C. Thus, the similarity can also be interpreted as the similarity between the partial range of the first images and the partial range of the second images. In other words, in the present embodiment, the intermediate data are compared to each other, in the form of similarity, between the first data elements 12A to 12C and the second data elements 62A to 62C, for all partial ranges belonging to the same hierarchy on the first data elements 12A to 12C with respect to the partial range belonging to a certain hierarchy on the second data elements 62A to 62C. However, as will be described later, the similarity may be obtained between the same partial ranges in the same hierarchy. Here, the hierarchy is associated with the size of the partial range. As described above, when the neuron layers 37, 38, and 39 are different from each other, the first data elements 12A to 12C, that is, the partial range defined on the first image, and the second data elements 62A to 62C, that is, the partial range defined on the second image are also different from each other in size. As the similarity, any index comparing two vectors can be used, for example, a cosine similarity, a mean squared error (MSE), or a peak S/N ratio (PSNR) is used. In step S36, among the similarities of the feature spectrum Sp of the first intermediate data corresponding to all the first data elements 12C for each partial region Rx of the first neuron layer 37, the second neuron layer 38, and the classification neuron layer 39, a value having the highest similarity is defined as the similarity of the partial region Rx of the second data set 62. The similarity of the partial region Rx of the second data set 62 is stored in the storage device 22 in association with the image data element which is the sensor data element of the partial region Rx and the activation a of the partial region Rx. In another embodiment, in step S36, the calculation target of the similarity may be each of the partial regions Rx at the same relative position in the same layer.

Next, in step S40, the processor 24 outputs information about the similarity which is calculated, that is, derived, by using the output section 26. The information about the similarity includes at least one of hierarchy partial range information indicating a position, layer label information indicating a hierarchy, similarity information, and comparison information. The hierarchy partial range information is partial range information for each hierarchy. Although not limited, in the present embodiment, the hierarchy partial range information is information indicating the partial range on the first data elements 12A, 12B, and 12C and the second data element 62A, 62B, and 62C corresponding to the partial region Rx in which the similarity is calculated for each hierarchy. In the above, the partial range on the first data elements 12A, 12B, and 12C corresponding to the partial region Rx is also referred to as the first partial data element. Further, in the above, the partial range on the second data elements 62A, 62B, and 62C corresponding to the partial region Rx is also referred to as the second partial data element. The layer label information is information for identifying the hierarchies of the first neuron layer 37, the second neuron layer 38, and the classification neuron layer 39, which are a plurality of neuron layers. The similarity information is information indicating the similarity between the partial regions Rx belonging to the same hierarchy, that is, the same neuron layers 37, 38, and 39. The comparison information is information indicating a magnitude relationship between the similarity and a predetermined threshold value. The comparison information is information generated when the processor 24 compares the similarity with a predetermined threshold value in step S40. In the data element of the second data set 62, when the similarity is smaller than the predetermined threshold value, it may be interpreted that the similarity with the feature of the known image in the hierarchy is low, and when the similarity is equal to or more than predetermined threshold value, it may be interpreted that the similarity with the feature of the known image in the hierarchy is high. It is discriminated to be the non-defective product. The predetermined threshold value is, for example, a reference value indicating that the similarity is high or low. In this way, the similarity can be used as a discrimination basis for the class determination of the non-defective product, the defective product, or the like. In step S40, information about the similarity, including the similarity, is generated and output to the output section 26. Here, when only one of the plurality of neuron layers 37, 38, and 39 is used as the discrimination basis, the partial range information may be used instead of the hierarchy partial range information. The partial range information is information indicating the partial range on the data element of which the similarity is calculated.

In step S36 of FIG. 10, when the similarity is calculated between the feature spectrum Sp of the partial range at a certain relative position on the first partial data element and the feature spectrum Sp at a relative position different from the corresponding relative position on the second partial data element, the information about the similarity includes information indicating the relative position of each partial range.

As described above, although the information about the similarity is output by using the liquid crystal monitor which is an example of the output section 26, the information may be output as audio information. In this case, the output section 26 includes a speaker.

As described above, by calculating the similarity based on the first intermediate data and the second intermediate data, for example, a neuron of which the similarity is less than a predetermined threshold value can be specified. Therefore, it is possible to output the discrimination basis of the second data elements 62A to 62C by using the model 30. Further, in the processing of step S36 of FIG. 10, by calculating the similarity between the first intermediate data of the first partial data element and the second intermediate data of the second partial data element of the region corresponding to the first partial data element, the similarity of the first partial data element and the second partial data element can be calculated. Therefore, since the information about the similarity is output by using the output section 26, it is possible to easily grasp which region in the second data element is used as the basis for discriminating the label. Therefore, the user can easily grasp the information about the similarity such as which neuron layer 37, 38, and 39 is used as the basis for the label discrimination. That is, the user can grasp, from the information about the similarity, a portion which is similar to the non-defective product, a portion which is not similar to the non-defective product, and each position and size for the second data elements 62A to 62C, which are the input data. In the processing of step S36, the target of the similarity calculation may not be the first intermediate data and the second intermediate data from the partial regions Rx at the same relative positions in the neuron layers 37, 38, and 39. Even in this way, by outputting the information about the similarity such as the layer label information for identifying the hierarchy of the second data element that is the calculation target and the partial region information indicating the partial region Rx, the user can easily grasp the information about the similarity, such as which neuron layers 37, 38, and 39 is used as the basis and which partial region Rx is used as the basis for discriminating the label.

FIG. 12 is a flowchart of second explanatory processing. The second explanatory processing is executed by the processor 24. The second explanatory processing is processing for explaining the discrimination whether the second data elements 62A to 62E are of the same type as the known first data elements 12A to 12C used for performing the learning of the model 30, and the basis thereof. FIG. 13 is a diagram for explaining a second data set 62*a*. In short, the second explanatory processing can be said to be processing for explaining whether the data that is not known is forcibly discriminated or is discriminated as known data.

As illustrated in FIG. 13, the second data set 62*a* has second data elements 62A to 62E of 5 types. The second data elements 62A, 62B, and 62C are the same as the second data elements 62A, 62B, and 62C illustrated in FIG. 6, respectively, and are image data elements obtained by imaging the dice which is the target of the same type as the first data elements 12A to 12C used when performing the learning of the model 30. The second data elements 62D and 62E are image data elements obtained by imaging the dice which is the target of a different type from the first data elements 12A to 12C used when performing the learning of the model 30. Specifically, the second data element 62D is an image data element obtained by imaging the dice with a cross-marked spot at a center spot of three spots on each surface. Further, the second data element 62E is an image data element obtained by imaging the dice with four spots on each surface. As described above, the second data elements 62D and 62E are the data elements of unknown types that are not used when performing the learning of the model 30. The size of the second data elements 62A to 62E is, for example, 32×32 pixels, which is the same as when performing the learning of the model 30. Further, 1100 pieces of each of the second data elements 62A to 62E are prepared, and the position of the spot of the dice is varied by a maximum of ±2 pixels and the size of the spot of the dice is varied by a maximum of ±2 pixels. The prepared second data elements 62A to 62E are input into the model 30 one by one, so that the class discrimination, that is, the label is discriminated.

As illustrated in FIG. 12, in step S30, the processor 24 inputs the second data elements 62A to 62E into the learned model 30 one by one, and executes the class discrimination for each of the second data elements 62A to 62E. Then, when the class discrimination is completed, the second intermediate data for each of the second data elements 62A to 62E is acquired from the model 30. Step S30 illustrated in FIG. 12 is the same processing as step S30 illustrated in FIG. 10. Next, in step S32*a*, the processor 24 extracts all the first intermediate data of each of the first data elements 12A to 12C used for performing the learning of the model 30 stored in the storage device 22.

Next, in step S34*a*, the processor 24 calculates the feature spectra of the second data elements 62A to 62E input into the model 30 and the feature spectra Sp of the extracted and learned first data elements 12A to 12C. Since the calculation method is the same as the method described in step S34 of FIG. 10, description thereof will be omitted here.

Next, in step S36*a*, the processor 24 calculates the similarity between the feature spectra Sp of the second data elements 62A to 62C and the feature spectra Sp of the first data elements 12A to 12C. As the similarity, for example, the cosine similarity is used. In step S36, a value having a highest similarity to all the first data elements 12A to 12C is set to the similarity of the partial region Rx for respective partial regions Rx of the first neuron layer 37, the second neuron layer 38, and the classification neuron layer 39. The similarity of the partial region Rx is stored in the storage device 22 in association with the partial range of the image data element corresponding to the partial region Rx and the activation a of the partial region Rx.

Next, in step S40*a*, the processor 24 outputs the information about the calculated similarity by using the output section 26. The information about the similarity includes at least one of the hierarchy partial range information and the partial range information indicating the position, the layer label information indicating the hierarchy, the similarity information, and the comparison information. The difference between step S40 illustrated in FIG. 10 and step S40*a* is that the threshold value of the similarity is different in step S40*a*. For example, in step S40*a*, the predetermined threshold value can discriminate, as known data elements, the second data elements 62A, 62B, and 62C, which are the same types as the data elements used for performing the learning of the model 30, and the second data elements 62D and 62E, which are different types from the data elements used for performing the learning of the model 30, are set to values that can be suggested as unknown data elements.

As described above, the same effects are achieved in that the same configuration and processing as those in the first explanatory processing are performed in the second explanatory processing. For example, by calculating the similarity based on the first intermediate data and the second intermediate data, for example, the neuron of which the similarity is less than a predetermined threshold value can be specified, so that the discrimination basis of the second data element using the model 30 can be output.

Figure 15:
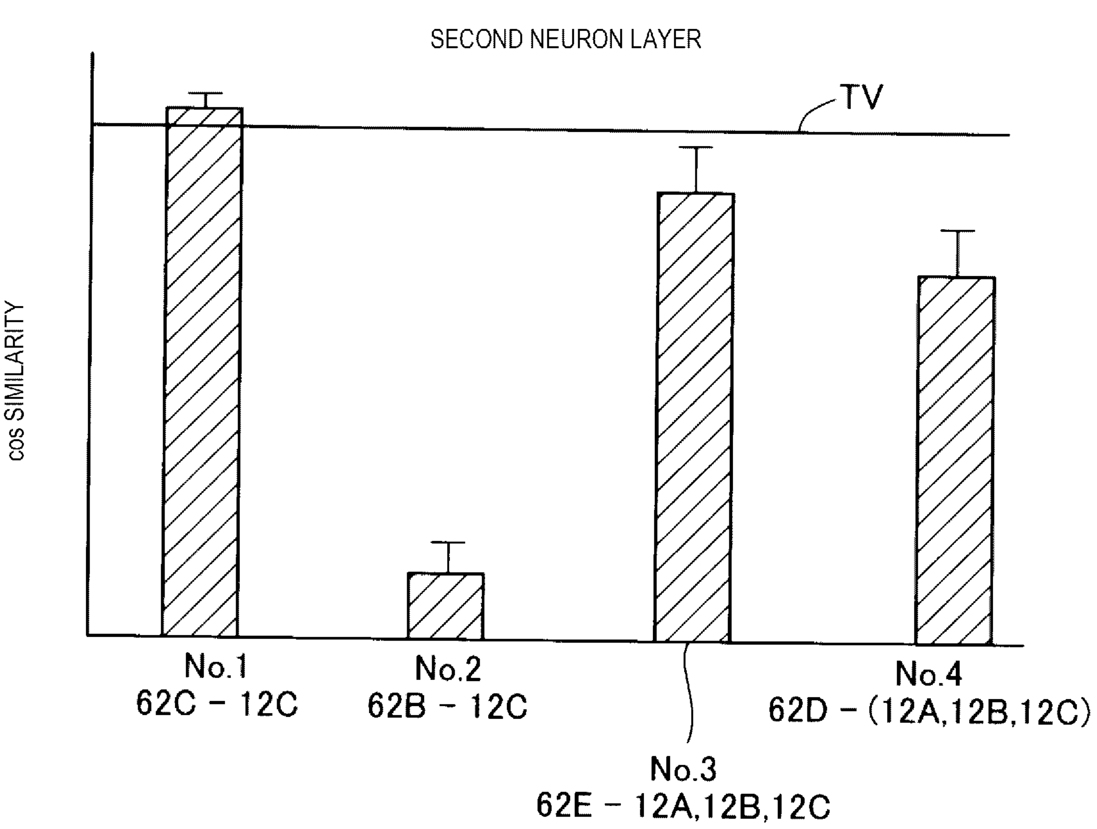
FIG. 15 is a graph illustrating a cosine similarity in a second neuron layer.

FIG. 14 is a graph illustrating the cosine similarity in the first neuron layer 37. FIG. 15 is a graph illustrating the cosine similarity in the second neuron layer 38.

Hereinafter, the effects of the first explanatory processing and the second explanatory processing will be described with reference to FIGS. 14 and 15.

The feature spectrum Sp is generated by weighting the vector M included in the partial region with the value of the activation a. The weighting is executed by multiplying each dimension of the vector M by the value of the activation a corresponding to the vector M. The graph of the feature spectrum Sp generated by this method is represented by, for example, taking an element number for identifying each dimension of each vector M on the horizontal axis and a weighted value on the vertical axis. In the present embodiment, one vector M has elements of 16 dimensions. In the first neuron layer 37 where the number of vectors M is 12 in the partial region Rx, there are 12 activations a. Therefore, the number of elements on the horizontal axis is 16×12 pieces in the first neuron layer 37. This number is the product of the number of dimensions of the vector M and the number of neurons included in one partial region R37 of the first neuron layer 37.

In the bar graphs of FIGS. 14 and 15, a notation "A-B" described under each of No. 1 to No. 4 means the following. That is, the letter "A" on the left side in the notation is the second data elements 62A to 62E, which is not used for performing the learning of the model 30, and the letter "B" on the right side in the notation is the first data elements 12A to 12C, which is used for performing the learning of the model 30. The bar graph of No. 1 illustrates the cosine similarity between the second data elements 62C and the first data elements 12C, which are the image data elements of the dices with three spots. The graph of No. 2 illustrates the cosine similarity between the second data elements 62B which are the image data elements of the dices with two spots, and the first data elements 12C which are the image data elements of the dices with three spots. The bar graph of No. 3 illustrates the cosine similarity between the second data elements 62E which are the image data elements of the dices with four spots, and the known first data elements 12A to 12C. The bar graph of No. 4 indicates the cosine similarity between the second data elements 62D which are the image data elements of the dices with three spots having the cross mark at the center spot and the known first data elements 12A to 12C.

The cosine similarity illustrated by each bar graph of No. 1 to No. 4 is calculated by the following method. In the following, a part of the known first data elements 12A to 12C used for learning is used, but all thereof for learning may be used. That is, between the randomly-selected 200 known first data elements 12A-12C and the prepared second data elements 62B-62E as comparison targets, the similarities are calculated for each of the partial regions R37 and R38 which are also the strides in the first neuron layer 37 and the second neuron layer 38, and only the value of the cosine similarity with the maximum similarity is stored. This operation is performed on 100 randomly selected second data elements 62B to 62E, and bar graphs are generated by representing the statistic. The standard deviation is represented by an error bar. In the present embodiment, the cosine similarity has a minimum value of "−1" and a maximum value of "1".

In FIG. 14, in the first neuron layer 37 corresponding to the comparison of local shapes, a result is obtained in which the cosine similarity of No. 4, which is the comparison with the second data elements 62D with the cross-marked spot, is lower than the cosine similarities of No. 1 to No. 3. By doing so, it can be explained, by using the model 30, that a different portion between the second data element 62D and the first data elements 12A, 12B, and 12C which are the known data elements is a local portion in the entire portions. On the other hand, it can be explained that the second data element 62E is not different from the known data, that is, the first data elements 12A, 12B, and 12C in a local portion. As illustrated in FIG. 14, in the cosine similarity of the feature spectrum Sp generated by using the above method, the threshold value TV, which is the boundary between No. 1 to No. 3 and No. 4, can be set. In the present embodiment, it was confirmed that there is the threshold value TV that is convenient for expressing the magnitude of the cosine similarity of the feature spectrum Sp acquired for the first neuron layer 37 in the comparison between the known data and various data. Therefore, if the threshold value TV is set appropriately, it can be said that the second data element 62D has a small similarity in the first neuron layer 37, and it can be explained that features different from the known data, that is, the first data elements 12A, 12B, and 12C are locally held.

In FIG. 15, in the second neuron layer 38 corresponding to the comparison of the intermediate shape or the comparison of the relative position of the local shape, a result is obtained that the cosine similarity of No. 1 is higher than cosine similarities of No. 2 to No. 4. By doing so, it is possible to improve the accuracy of the explanation of the basis for labeling "unknown" and "known" by using the model 30. Further, it can be explained that the difference between the second data element 62B and the first data element 12C, which is the known data element, lies on the relative position of the local shape in the entire portions. Further, it can be explained that another difference between the second data element 62E and the first data elements 12A, 12B, and 12C, which are known data elements, lies on the relative position of the local shape in the entire portions. As illustrated in FIG. 15, in the cosine similarity of the feature spectrum Sp generated by using the above method, the threshold value TV, which is the boundary between No. 1 and No. 2 to No. 4, can be set. In the present embodiment, it was confirmed that there is the threshold value TV that is convenient for expressing the magnitude of the cosine similarity of the feature spectrum Sp acquired for the second neuron layer 38 in the comparison between the known data and various data. That is, the second data elements 62B and 62E having dices different in the disposition of the spots can be explained by the low similarity derived with respect to the second neuron layer 38. In other words, it can be explained that the second data element 62B is different from the first data element 12C, which is the non-defective product, in the disposition of the spots of the dice. It can be explained that the second data element 62E has a different disposition of the spots of the dice from any of the known first data elements 12A, 12B, and 12C. The second data element 62D is also low, and this is because the network information is transmitted from the lower layer to the upper layer. Therefore, if the lower layer has different features, it will be difficult to obtain the normal similarity in the upper layer.

The feature spectrum Sp for calculating the similarity is not limited to the above description. For example, the feature spectrum Sp may be generated by weighting the vector M included in the partial region Rx by a correction value acquired by applying the Softmax function to the value of the activation a, or the feature spectrum Sp may be generated by arranging the value of the vector M for each element with respect to the element in which the vector M included in the partial region Rx is rearranged in one dimension. That is, the method of calculating the similarity may be to calculate the similarity between the feature spectrum Sp of the first vector M1 and the feature spectrum Sp of the second vector M2.

Further, the calculation method of the similarity is not limited to the method described above. The calculation method of the similarity may be, for example, for calculating the similarity between the first activation a1 and the second activation a2. Specifically, the calculation method of the similarity may be for calculating the similarity between the feature spectrum Sp having a plurality of first activations a1 as elements and the feature spectrum Sp having a plurality of second activations a2 as elements. In this case, for example, the feature spectrum Sp is generated or visualized by plotting each element of the activation a included in the partial region Rx on the horizontal axis and the value of the activation a for each element on the vertical axis.

According to the above embodiment, by calculating the similarity between the first intermediate data and the second intermediate data, for example, the neuron of which the similarity is less than a predetermined threshold value can be specified. Therefore, it is possible to output the discrimination basis of the second data elements 62A to 62E by using the model 30. By outputting the label discrimination basis of, it is possible to improve, for example, a manufacturing process or the like for reducing the occurrence of the defective products by analyzing the label discrimination basis.

Further, according to the above embodiment, the size of the partial range corresponding to a group of neurons (also called a neuron group) in the depth direction, which is a partial range of input data elements (images in the present embodiment) and is included in each layer of the hierarchical type vector neural network model, tends to qualitatively increase from small to large from the lower layer to the upper layer, and the size is adjustable to some extent under this tendency. Therefore, when the features included in the data element have the hierarchical property, the network structure of the model 30 can be adjusted so that each of the layers included in the model 30 corresponds to the feature of each hierarchy, that is, corresponds to the feature of each size. Further, in the hierarchical type vector neural network model, a correlation of the partial range on the data element (for example, on the image) corresponding to the neuron group in each layer is maintained from the lower layer to the upper layer. From this, by comparing between the first intermediate data and the second intermediate data for each of the neuron layers 37, 38, and 39, the discrimination result of each data element of the second input data set 60 can be explained from a viewpoint of each hierarchy of the feature. The first intermediate data is data acquired from the neuron layers 37, 38, and 39 by giving to the learned model 30, as an input, the first data set 12 configured of a plurality of data elements used for learning. Further, the second intermediate data is data acquired from the neuron layers 37, 38, and 39 by giving to the model 30, as an input, the data elements not used for learning, each data element of the second data set 62 in the present embodiment.

B. Other Embodiments

B-1. Other Embodiment 1

In the above embodiment, the similarity between the feature spectrum Sp of the first intermediate data and the feature spectrum Sp of the second intermediate data is the cosine similarity, but the similarity is not limited to this, and various similarities may be used depending on elements for comparing the similarity. For example, the similarity may be a square error, or image similarity (structural similarity) may be used. Further, for example, the similarity may be a similarity based on an inner or outer product of two vectors, a distance between two points represented by two vectors, or a similarity based on a norm.

B-2. Other Embodiment 2

In the above embodiment, the first explanatory processing and the second explanatory processing may be configured to be automatically switchable by the processor 24. For example, in a case where the processor 24 executes the first explanatory processing, when a ratio discriminated to be the defective product to a total number of input data elements becomes equal to or more than a predetermined value, the first explanatory processing may be switched to the second explanatory processing.

B-3. Other Embodiment 3

In the above embodiment, the program stored in the non-volatile storage medium 23 is executed by one processor 24, but may be executed by two or more processors 24.

B-4. Other Embodiment 4

The generation method of the first intermediate data and the second intermediate data is not limited to the above embodiment, and for example, the first intermediate data and the second intermediate data may be generated by using a Kmeans method. Further, the first intermediate data and the second intermediate data may be generated by using conversion such as PCA, ICA, or Fisher. Further, the conversion methods of the first intermediate data and the second intermediate data may be different.

C. Other Aspects

The present disclosure is not limited to the above embodiments, and can be realized in various aspects without departing from the spirit thereof. For example, the present disclosure can also be realized by the following aspects. The technical features in the above embodiments corresponding to technical features in each of the aspects described below can be replaced or combined as appropriate in order to solve some or all of the problems of the present disclosure, or achieve some or all of the effects of the present disclosure. Further, if the technical feature is not described as essential in the present specification, it can be appropriately deleted.

(1) According to the first aspect of the present disclosure, there is provided a method for causing one or more processors to execute. The method of causing one or more processors to execute: performing learning of a model that is an algorithm of a vector neural network type to reproduce correspondence between a plurality of first data elements included in a first data set and a pre-label corresponding to each of the plurality of first data elements, in which the model has one or more neuron layers, each of the one or more neuron layers has one or more neuron groups, each of the one or more neuron groups has one or more neurons, and each of the one or more neurons outputs first intermediate data based on at least one of a first vector and a first activation; and inputting the first data set into the learned model and acquiring the first intermediate data output by the one or more neurons by being associated with the neuron. According to this aspect, the first intermediate data can be acquired based on at least one of the first activation and the first vector included in the neuron. Therefore, the second intermediate data is acquired based on at least one of the second activation and the second vector included in the neuron when the second data element of the discrimination target is input into the model. The similarity between the first intermediate data and the second intermediate data can be calculated. By calculating the similarity, for example, the neuron of which the similarity is less than a predetermined threshold value can be specified, so that the discrimination basis of the second data element using the model can be output.

(2) According to the second aspect of the present disclosure, there is provided a method of causing one or more processors to execute by using the model learned in advance. The model is learned to reproduce correspondence between a plurality of first data elements included in a first data set and a pre-label corresponding to each of the plurality of first data elements, the model uses an algorithm of a vector neural network type and has one or more neuron layers, each of the one or more neuron layers has one or more neuron groups, each of the one or more neuron groups has one or more neurons, and each of the one or more neurons outputs first intermediate data based on at least one of a first vector and a first activation. The method includes inputting the first data set into the learned model, and acquiring the first intermediate data output by the one or more neurons by being associated with the neuron; inputting a second data element into the model, and acquiring second intermediate data based on at least one of a second vector and a second activation included in the one or more neurons, for each of the one or more neuron layers; and calculating a similarity between the first intermediate data and the second intermediate data, for the one or more neuron layers. According to this aspect, the first intermediate data can be acquired based on at least one of the first activation and the first vector included in the neuron. Therefore, the second intermediate data is acquired based on at least one of the second activation and the second vector included in the neuron when the second data element of the discrimination target is input into the model. The similarity between the first intermediate data and the second intermediate data can be calculated. By calculating the similarity, for example, the neuron of which the similarity is less than a predetermined threshold value can be specified, so that the discrimination basis of the second data element using the model can be output.

(3) In the above aspect, it may further include outputting the information about the calculated similarity. According to this aspect, the user can easily grasp the information about the similarity.

(4) In the above aspect, it may further include inputting the second data element into the model to discriminate the label of the second data element. According to this aspect, the label of the second data element using the model can be discriminated.

(5) In the above aspect, it may further include outputting the discrimination result of the label. According to this aspect, the user can easily grasp the label discrimination result.

(6) In the above aspect, the neuron layer may have a plurality of the neurons. The acquiring of the first intermediate data may include acquiring the first intermediate data included in each of the plurality of the neurons, and associating the first partial range that is apart of the first data element corresponding to the acquired first intermediate data with the corresponding first intermediate data. The acquiring of the second intermediate data may include acquiring the second intermediate data included in each of the plurality of the neurons, and associating the second partial range that is a part of the second data element corresponding to the acquired second intermediate data with the corresponding second intermediate data. The calculating of the similarity may include calculating the similarity between the first intermediate data of the first partial range and the second intermediate data of the second partial range corresponding to the first partial range. According to this aspect, the similarity between the first partial data element and the second partial data element can be calculated by calculating the similarity between the first intermediate data of the first partial range and the second intermediate data of the second partial range corresponding to the first partial range. Therefore, it is possible to easily grasp which range in the second data element is used as the basis for discriminating the label.

(7) In the above aspect, the information about the similarity may include the partial range information indicating the first partial range and the second partial range for which the calculation of the similarity is performed. According to this aspect, the user can easily grasp which partial region is used as the basis for discriminating the label.

(8) In the above aspect, the neuron layer may have the hierarchy structure configured of a plurality of layers, and the calculating of the similarity may include calculating the similarity between the first intermediate data of the first partial range and the second intermediate data of the second partial range corresponding to the first partial range, for each of the neuron layers. According to this aspect, the similarity between the first intermediate data and the second intermediate data can be calculated for each layer of the plurality of neuron layers.

(9) In the above aspect, the neuron layer may have a plurality of the neurons. The acquiring of the first intermediate data may include acquiring the first intermediate data included in each of the plurality of neurons, and associating the first partial range which is a part of the first data element corresponding to the acquired first intermediate data with the corresponding first intermediate data. The acquiring of the second intermediate data may include acquiring the second intermediate data included in each of the plurality of neurons, and associating the second partial range that is a part of the second data element corresponding to the acquired second intermediate data with the corresponding second intermediate data. The calculating of the similarity may include calculating the similarity between the first intermediate data and the second intermediate data. According to this aspect, the similarity between the first partial range and the second partial range can be calculated by calculating the similarity between the first intermediate data of the first partial range and the second intermediate data of the second partial range. Therefore, it is possible to easily grasp which region in the second data element is used as the basis for discriminating the label.

(10) In the above aspect, the information about the similarity may include partial range information indicating the second partial range for which the calculation of the similarity is performed. According to this aspect, the user can easily grasp which partial range is used as the basis for discriminating the label.

(11) In the above aspect, the information about the similarity may include the partial range information indicating the first partial range and the second partial range for which the calculation of the similarity is performed. According to this aspect, the user can easily grasp which partial range is used as the basis for discriminating the label.

(12) In the above aspect, the neuron layer may have the hierarchy structure configured of a plurality of layers, and the calculating of the similarity may include calculating the similarity between the first intermediate data and the second intermediate data for each neuron layer. According to this aspect, the similarity between the first intermediate data and the second intermediate data can be calculated for each layer of the plurality of neuron layers.

(13) In the above aspect, the information about the similarity may further include at least one of layer label information for identifying the hierarchy of the plurality of the neuron layers, similarity information indicating the similarity for each hierarchy, hierarchy partial range information indicating the hierarchy partial range which is the second partial range in which the similarity is calculated for each hierarchy, comparison information indicating the magnitude relationship between the similarity, and the predetermined threshold value. According to this aspect, the user can grasp the information about the similarity in more detail.

(14) In the above aspect, the first intermediate data may include at least the first vector, the second intermediate data may include at least the second vector. The calculating of the similarity may include calculating the similarity between the first vector and the second vector. According to this aspect, the similarity can be calculated by using the first vector and the second vector.

(15) In the above aspect, the first intermediate data may include at least the first activation, the second intermediate data may include at least the second activation, and the calculating of the similarity may include calculating the similarity between the first activation and the second activation. According to this aspect, the similarity can be calculated by using the first activation and the second activation.

(16) In the above aspect, the first intermediate data may include the first vector and the first activation, and the second intermediate data may include the second vector and the second activation. The calculating of the similarity may include weighting the first vector by the first activation, weighting the second vector by the second activation, and calculating the similarity between the weighted first vector and the weighted second vector. According to this aspect, the similarity can be calculated by using the weighted first vector and the weighted second vector.

(17) According to the third aspect of the present disclosure, an apparatus is provided. The apparatus includes: one or more processors. The one or more processors is configured to execute: performing learning of a model that is an algorithm of a vector neural network type to reproduce correspondence between a plurality of first data elements included in a first data set and a pre-label corresponding to each of the plurality of first data elements, in which the model has one or more neuron layers, each of the one or more neuron layers has one or more neuron groups, each of the one or more neuron groups has one or more neurons, and each of the one or more neurons outputs first intermediate data based on at least one of a first vector and a first activation; and inputting the first data set into the learned model and acquiring the first intermediate data output by the one or more neurons by being associated with the neuron. According to this aspect, the first intermediate data can be acquired based on at least one of the first activation and the first vector included in the neuron. Therefore, the second intermediate data is acquired based on at least one of the second activation and the second vector included in the neuron when the second data element of the discrimination target is input into the model. The similarity between the first intermediate data and the second intermediate data can be calculated. By calculating the similarity, for example, the neuron of which the similarity is less than a predetermined threshold value can be specified, so that the discrimination basis of the second data element using the model can be output.

(18) According to a fourth aspect of the present disclosure, an apparatus is provided. The apparatus includes: a storage device that stores a model learned to reproduce correspondence between a plurality of first data elements included in a first data set and a pre-label corresponding to each of the plurality of first data elements, in which the model uses an algorithm of a vector neural network type and has one or more neuron layers, each of the one or more neuron layers has one or more neuron groups, each of the one or more neuron groups has one or more neurons, and each of the one or more neurons outputs first intermediate data based on at least one of a first vector and a first activation; a first acquisition section that inputs the first data set into the learned model and acquires the first intermediate data output by the one or more neurons by being associated with the neuron; a second acquisition section that inputs a second data element into the model, and acquires second intermediate data based on at least one of a second vector and a second activation included in the one or more neurons; and a calculation section that calculates a similarity between the first intermediate data and the second intermediate data, for the one or more neuron layers. According to this aspect, the first intermediate data can be acquired based on at least one of the first activation and the first vector included in the neuron. Therefore, the second intermediate data is acquired based on at least one of the second activation and the second vector included in the neuron when the second data element of the discrimination target is input into the model. The similarity between the first intermediate data and the second intermediate data can be calculated. By calculating the similarity, for example, the neuron of which the similarity is less than a predetermined threshold value can be specified, so that the discrimination basis of the second data element using the model can be output.

(19) According to a fifth aspect of the present disclosure, a non-temporary computer-readable medium is provided. Performing learning of a model that is an algorithm of a vector neural network type to reproduce correspondence between a plurality of first data elements included in a first data set and a pre-label corresponding to each of the plurality of first data elements, in which the model has one or more neuron layers, each of the one or more neuron layers has one or more neuron groups, each of the one or more neuron groups has one or more neurons, and each of the one or more neurons outputs first intermediate data based on at least one of a first vector and a first activation; and inputting the first data set into the learned model and acquiring the first intermediate data output by the one or more neurons by being associated with the neuron. According to this aspect, the first intermediate data can be acquired based on at least one of the first activation and the first vector included in the neuron. Therefore, the second intermediate data is acquired based on at least one of the second activation and the second vector included in the neuron when the second data element of the discrimination target is input into the model. The similarity between the first intermediate data and the second intermediate data can be calculated. By calculating the similarity, for example, the neuron of which the similarity is less than a predetermined threshold value can be specified, so that the discrimination basis of the second data element using the model can be output.

(20) According to a sixth aspect of the present disclosure, a non-temporary computer-readable medium executed by using the model learned in advance is provided. The model is learned to reproduce correspondence between a plurality of first data elements included in a first data set and a pre-label corresponding to each of the plurality of first data elements, the model uses an algorithm of a vector neural network type and has one or more neuron layers, each of the one or more neuron layers has one or more neuron groups, each of the one or more neuron groups has one or more neurons, and each of the one or more neurons outputs first intermediate data based on at least one of a first vector and a first activation. The non-temporary computer-readable medium causes one or more processors to execute: a function of inputting the first data set into the learned model and acquiring the first intermediate data output by the one or more neurons by being associated with the neuron; a function of inputting a second data element into the model, and acquiring second intermediate data based on at least one of a second vector and a second activation included in the one or more neurons, for each of the one or more neuron layers; and a function of calculating a similarity between the first intermediate data and the second intermediate data, for the one or more neuron layers. According to this aspect, the first intermediate data can be acquired based on at least one of the first activation and the first vector included in the neuron. Therefore, the second intermediate data is acquired based on at least one of the second activation and the second vector included in the neuron when the second data element of the discrimination target is input into the model. The similarity between the first intermediate data and the second intermediate data can be calculated. By calculating the similarity, for example, the neuron of which the similarity is less than a predetermined threshold value can be specified, so that the discrimination basis of the second data element using the model can be output.

In addition to the above aspects, the present disclosure can be realized in a form of a system including a non-volatile storage medium in which a computer program is recorded, or an apparatus.

What is claimed is:

1. A method of causing one or more processors to execute:
- performing learning of a model that is an algorithm of a vector neural network type to reproduce correspondence between a plurality of first data elements included in a first data set and a pre-label corresponding to each of the plurality of first data elements, in which the model has a plurality of neuron layers, each neuron layer of the plurality of neuron layers has one or more neuron groups, each of the one or more neuron groups has one or more neurons, and each of the one or more neurons outputs first intermediate data based on at least one of a first vector and a first activation, wherein a size of a partial range defined by multiplying a height, a width and a depth in each neuron layer of the plurality of neuron layers is different for some neuron layers; and
- inputting the first data set into the learned model and acquiring the first intermediate data output by the one or more neurons by being included with a first partial range which is a partial range on the plurality of first data elements and to which each neuron corresponds based on at least one of the first activation and the first vector included in each neuron of each of the plurality of neuron layers.

2. A method of causing one or more processors to execute using a model learned in advance, in which the model is learned to reproduce correspondence between a plurality of first data elements included in a first data set and a pre-label corresponding to each of the plurality of first data elements, and the model uses an algorithm of a vector neural network type and has a plurality of neuron layers, each neuron layer of the plurality of neuron layers has one or more neuron groups, each of the one or more neuron groups has one or more neurons, and each of the one or more neurons outputs first intermediate data based on at least one of a first vector and a first activation, wherein a size of a partial range defined by multiplying a height, a width and a depth in each neuron layer of the plurality of neuron layers is different for some neuron layers;

the method comprising:
- inputting the first data set into the learned model, and acquiring the first intermediate data output by the one or more neurons by being included with a first partial range which is a partial range on the plurality of first data elements and to which each neuron corresponds based on at least one of the first activation and the first vector included in each neuron of each of the plurality of neuron layers;
- inputting a second data element into the model, and acquiring second intermediate data based on at least one of a second vector and a second activation included in the one or more neurons, for each of the plurality of neuron layers; and
- calculating a similarity between the first intermediate data and the second intermediate data, for the plurality of neuron layers.

3. The method according to claim 2, further comprising:
- outputting information about the calculated similarity.

4. The method according to claim 2, further comprising:
- inputting the second data element into the model to discriminate a label of the second data element.

5. The method according to claim 4, further comprising:
- outputting a discrimination result of the label.

6. The method according to claim 2, wherein
- a neuron layer of the plurality of neuron layers has a plurality of the neurons,
- the acquiring of the first intermediate data includes
- acquiring the first intermediate data included in each of the plurality of the neurons, and
- associating a first partial range, which is a part of the first data element corresponding to the acquired first intermediate data, with the corresponding first intermediate data,
- the acquiring of the second intermediate data includes
- acquiring the second intermediate data included in each of the plurality of the neurons, and
- associating a second partial range, which is a part of the second data element corresponding to the acquired second intermediate data, with the corresponding second intermediate data, and the calculating of the similarity includes calculating the similarity between the first intermediate data included with the first partial range and the second intermediate data included with the second partial range corresponding to the first partial range.

7. The method according to claim 6, wherein information about the similarity includes partial range information indicating the first partial range and the second partial range in which the similarity calculation is performed.

8. The method according to claim 6, wherein the neuron layer has a hierarchy structure configured of a plurality of layers, and the calculating of the similarity includes calculating the similarity between the first intermediate data of the first partial range and the second intermediate data of the second partial range corresponding to the first partial range, in each neuron layer.

9. The method according to claim 2, wherein a neuron layer of the plurality of neuron layers has a plurality of the neurons, the acquiring of the first intermediate data includes acquiring the first intermediate data included in each of the plurality of the neurons, and associating a first partial range, which is a part of the first data element corresponding to the acquired first intermediate data, with the corresponding first intermediate data, the acquiring of the second intermediate data includes acquiring the second intermediate data included in each of the plurality of the neurons, and associating a second partial range, which is a part of the second data element corresponding to the acquired second intermediate data, with the corresponding second intermediate data, and the calculating of the similarity includes calculating the similarity between the first intermediate data and the second intermediate data.

10. The method according to claim 9, wherein the information about the similarity includes partial range information indicating the second partial range in which the similarity calculation is performed.

11. The method according to claim 9, wherein the information about the similarity includes partial range information indicating the first partial range and the second partial range in which the similarity calculation is performed.

12. The method according to claim 9, wherein the neuron layer has a hierarchy structure configured of a plurality of layers, and the calculating of the similarity includes calculating the similarity between the first intermediate data and the second intermediate data in each neuron layer.

13. The method according to claim 8, wherein the information about the similarity further includes at least one of layer label information for identifying a hierarchy of the plurality of neuron layers, similarity information indicating the similarity for each hierarchy, hierarchy partial range information indicating a hierarchy partial range which is the second partial range in which the similarity calculation is performed in each hierarchy, and comparison information indicating a magnitude relationship between the similarity and a predetermined threshold value.

14. The method according to claim 2, wherein the first intermediate data includes at least the first vector, the second intermediate data includes at least the second vector, and the calculating of the similarity includes calculating the similarity between the first vector and the second vector.

15. The method according to claim 2, wherein the first intermediate data includes at least the first activation, the second intermediate data includes at least the second activation, and the calculating of the similarity includes calculating the similarity between the first activation and the second activation.

16. The method according to claim 2, wherein the first intermediate data includes the first vector and the first activation, and the second intermediate data includes the second vector and the second activation, and the calculating of the similarity includes weighting the first vector by the first activation, weighting the second vector by the second activation, and calculating the similarity between the weighted first vector and the weighted second vector.

17. An apparatus comprising:

one or more processors, wherein the one or more processors is configured to execute:

performing learning of a model that is an algorithm of a vector neural network type to reproduce correspondence between a plurality of first data elements included in a first data set and a pre-label corresponding to each of the plurality of first data elements, in which the model has a plurality of neuron layers, each neuron layer of the plurality of neuron layers has one or more neuron groups, each of the one or more neuron groups has one or more neurons, and each of the one or more neurons outputs first intermediate data based on at least one of a first vector and a first activation, wherein a size of a partial range defined by multiplying a height, a width and a depth in each neuron layer of the plurality of neuron layers is different for some neuron layers; and inputting the first data set into the learned model and acquiring the first intermediate data output by the one or more neurons by being included with a first partial range which is a partial range on the plurality of first data elements and to which each neuron corresponds based on at least one of the first activation and the first vector included in each neuron of each of the plurality of neuron layers.

18. An apparatus comprising:

a storage device that stores a model learned to reproduce correspondence between a plurality of first data elements included in a first data set and a pre-label corresponding to each of the plurality of first data elements, in which the model uses an algorithm of a vector neural network type and has a plurality of neuron layers, each neuron layer of the plurality of neuron layers has one or more neuron groups, each of the one or more neuron groups has one or more neurons, and each of the one or more neurons outputs first intermediate data based on at least one of a first vector and a first activation, wherein a size of a partial range defined by multiplying a height, a width and a depth in each neuron layer of the plurality of neuron layers is different for some neuron layers; and one or more processors, wherein the one or more processors is configured to execute:

inputting the first data set into the learned model and acquiring the first intermediate data output by the one or more neurons by being included with a first partial range which is a partial range on the plurality of first data elements and to which each neuron corresponds based on at least one of the first activation and the first vector included in each neuron of each of the plurality of neuron layers;

inputting a second data element into the model, and acquiring second intermediate data based on at least one of a second vector and a second activation included in the one or more neurons, for each of the plurality of neuron layers; and calculating a similarity between the first intermediate data and the second intermediate data, for the plurality of neuron layers.

19. A non-transitory computer-readable medium storing instructions for causing one or more processors to execute:

performing learning of a model that is an algorithm of a vector neural network type to reproduce correspondence between a plurality of first data elements included in a first data set and a pre-label corresponding to each of the plurality of first data elements, in which the model has a plurality of neuron layers, each neuron layer of the plurality of neuron layers has one or more neuron groups, each of the one or more neuron groups has one or more neurons, and each of the one or more neurons outputs first intermediate data based on at least one of a first vector and a first activation, wherein a size of a partial range defined by multiplying a height, a width and a depth in each neuron layer of the plurality of neuron layers is different for some neuron layers; and inputting the first data set into the learned model and acquiring the first intermediate data output by the one or more neurons by being included with a first partial range which is a partial range on the plurality of first data elements and to which each neuron corresponds based on at least one of the first activation and the first vector included in each neuron of each of the plurality of neuron layers.

20. A non-transitory computer-readable medium storing instructions for causing one or more processors to execute using a model learned in advance, wherein the model is learned to reproduce correspondence between a plurality of first data elements included in a first data set and a pre-label corresponding to each of the plurality of first data elements, the model uses an algorithm of a vector neural network type and has a plurality of neuron layers, each neuron layer of the plurality of neuron layers has one or more neuron groups, each of the one or more neuron groups has one or more neurons, and each of the one or more neurons outputs first intermediate data based on at least one of a first vector and a first activation, wherein a size of a partial range defined by multiplying a height, a width and a depth in each neuron layer of the plurality of neuron layers is different for some neuron layers;

the instructions causes one or more processors to further execute:

inputting the first data set into the learned model and acquiring the first intermediate data output by the one or more neurons by being included with a first partial range which is a partial range on the plurality of first data elements and to which each neuron corresponds based on at least one of the first activation and the first vector included in each neuron of each of the plurality of neuron layers;

inputting a second data element into the model, and acquiring second intermediate data based on at least one of a second vector and a second activation included in the one or more neurons, for each of the plurality of neuron layers; and calculating a similarity between the first intermediate data and the second intermediate data, for the plurality of neuron layers.

* * * * *